United States Patent
Park et al.

(10) Patent No.: US 10,847,841 B2
(45) Date of Patent: Nov. 24, 2020

(54) ELECTROLYTE ADDITIVE FOR LITHIUM BATTERY, ORGANIC ELECTROLYTE SOLUTION INCLUDING THE SAME, AND LITHIUM BATTERY INCLUDING THE SAME

(71) Applicants: Samsung Electronics Co., Ltd., Suwon-si (KR); Samsung SDI Co., Ltd., Yongin-si (KR)

(72) Inventors: Insun Park, Suwon-si (KR); Myongchun Koh, Hwaseong-si (KR); Dongyoung Kim, Yongin-si (KR); Eunha Park, Seoul (KR); Yoonsok Kang, Seongnam-si (KR); Jinah Seo, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 42 days.

(21) Appl. No.: 16/185,042

(22) Filed: Nov. 9, 2018

(65) Prior Publication Data

US 2019/0148772 A1 May 16, 2019

(30) Foreign Application Priority Data

Nov. 15, 2017 (KR) .................. 10-2017-0152499
Oct. 31, 2018 (KR) .................. 10-2018-0131718

(51) Int. Cl.
*H01M 10/0567* (2010.01)
*H01M 10/42* (2006.01)
(Continued)

(52) U.S. Cl.
CPC ....... *H01M 10/0567* (2013.01); *H01M 4/366* (2013.01); *H01M 4/386* (2013.01);
(Continued)

(58) Field of Classification Search
CPC ......... H01M 10/0567; H01M 10/4235; H01M 10/0569; H01M 10/0525
See application file for complete search history.

(56) References Cited

U.S. PATENT DOCUMENTS

2004/0197667 A1  10/2004  Noh et al.
2008/0206649 A1   8/2008  Kawashima
(Continued)

FOREIGN PATENT DOCUMENTS

EP  1458048 A1  9/2004
EP  1463143 A2  9/2004
(Continued)

OTHER PUBLICATIONS

Extended European Search Report for European Patent Application No. 18204087.3 dated Feb. 12, 2019.
(Continued)

*Primary Examiner* — Stewart A Fraser
(74) *Attorney, Agent, or Firm* — Cantor Colburn LLP

(57) ABSTRACT

An electrolyte additive for a lithium battery comprising a sulfone compound represented by Formula 1:

Formula 1

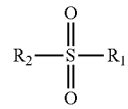

wherein, in Formula 1,
$R_1$ is a halogen-substituted or unsubstituted C1-C5 alkyl group, a halogen-substituted or unsubstituted C4-C10 cycloalkyl group, a halogen-substituted or unsubstituted C5-C10 aryl group, or a halogen-substituted or
(Continued)

unsubstituted C2-C10 heteroaryl group, and $R_2$ is a halogen-substituted or unsubstituted C2-C10 alkenyl group.

22 Claims, 1 Drawing Sheet

(51) Int. Cl.
*H01M 10/0569* (2010.01)
*H01M 10/0568* (2010.01)
*H01M 10/0525* (2010.01)
*H01M 4/587* (2010.01)
*H01M 4/505* (2010.01)
*H01M 4/36* (2006.01)
*H01M 4/38* (2006.01)
*H01M 4/525* (2010.01)

(52) U.S. Cl.
CPC ........... *H01M 4/505* (2013.01); *H01M 4/525* (2013.01); *H01M 4/587* (2013.01); *H01M 10/0525* (2013.01); *H01M 10/0568* (2013.01); *H01M 10/0569* (2013.01); *H01M 10/4235* (2013.01); *H01M 2300/0025* (2013.01)

(56) References Cited

U.S. PATENT DOCUMENTS

| | | | |
|---|---|---|---|
| 2010/0087165 | A1 | 4/2010 | Kim et al. |
| 2016/0190648 | A1* | 6/2016 | Park .................. H01M 10/0567 429/332 |
| 2017/0162868 | A1* | 6/2017 | Kim ...................... H01M 4/134 |

FOREIGN PATENT DOCUMENTS

| | | | |
|---|---|---|---|
| EP | 1463143 | A3 | 4/2008 |
| JP | 2007273395 | A | 10/2007 |
| JP | 2008041296 | A | 2/2008 |
| JP | 2009110798 | A | 5/2009 |
| JP | 5405238 | B2 | 2/2014 |
| KR | 0515298 | B1 | 9/2005 |
| KR | 20080087343 | A | 10/2008 |
| KR | 20080097343 | A | 11/2008 |
| KR | 20150145980 | A | 12/2015 |

OTHER PUBLICATIONS

Zheng et al., "Construction a Protective Interface Film on Layered Lithium-Rich Cathode Using an Electrolyte Additive with Special Molecule Structure", Applied Materials, ACS Appl. Mater. & Interfaces, 8, 2016, 30116-30125.

Tafeun Yim et al, "Understanding the effects of a multi-functionalized additive on the cathodeeelectrolyte interfacial stability of Ni-rich materials", Journal of power sources, Nov. 11, 2015, pp. 431-438, vol. 302.

Office Action issued by the European Patent Office dated Aug. 25, 2020 in the examination of the European Patent Application No. 18204087.3, which corresponds to U.S. Appl. No. 16/185,042.

* cited by examiner

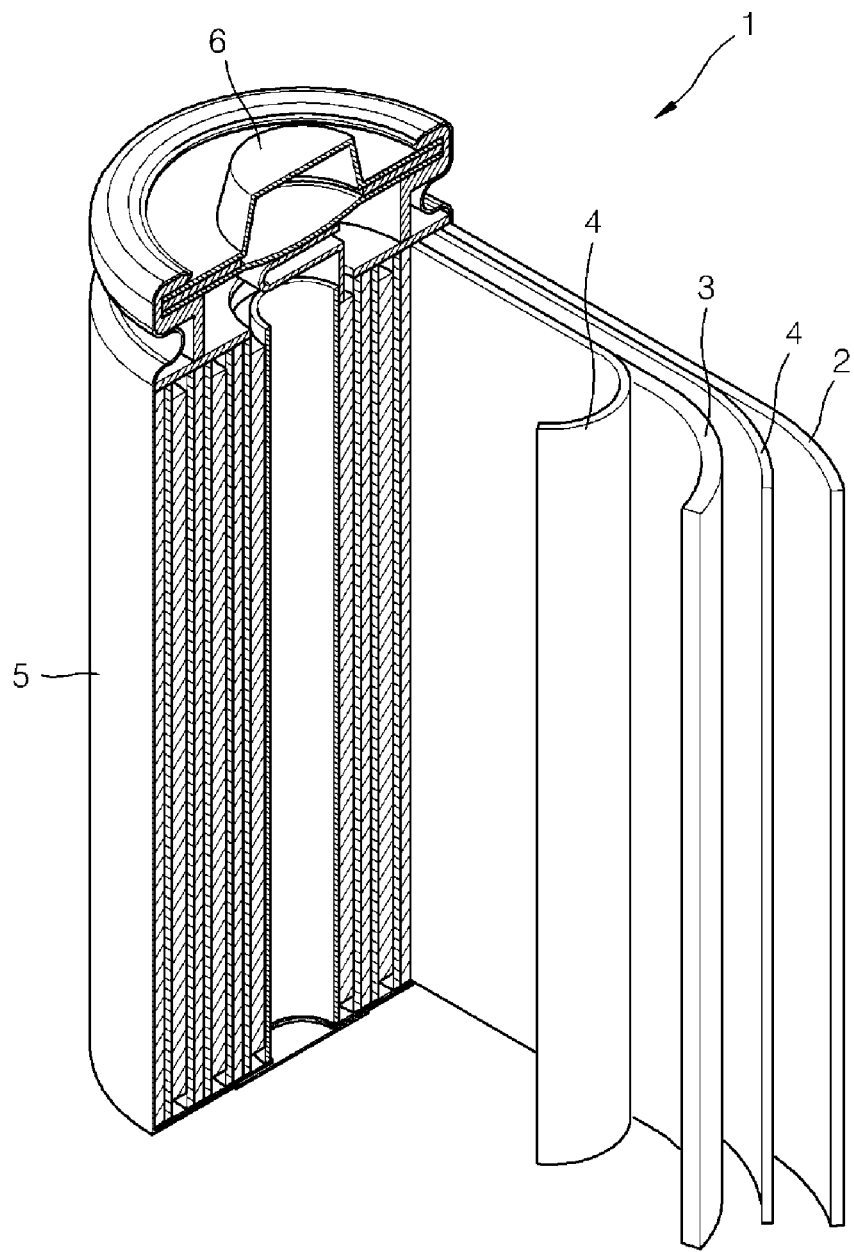

ELECTROLYTE ADDITIVE FOR LITHIUM BATTERY, ORGANIC ELECTROLYTE SOLUTION INCLUDING THE SAME, AND LITHIUM BATTERY INCLUDING THE SAME

CROSS-REFERENCE TO RELATED APPLICATION

This application claims the benefit of and priority to Korean Patent Application No. 10-2017-0152499, filed on Nov. 15, 2017, in the Korean Intellectual Property Office, and Korean Patent Application No. 10-2018-0131718, filed on Oct. 31, 2018, in the Korean Intellectual Property Office, and all the benefits accruing therefrom under 35 U.S.C. § 119, the contents of which are incorporated herein in their entireties by reference.

BACKGROUND

1. Field

The present disclosure relates to an electrolyte additive for a lithium battery, an organic electrolyte solution including the same, and a lithium battery including the same.

2. Description of the Related Art

Lithium batteries are used as power sources for portable electronic devices such as video cameras, mobile phones, and laptop computers. Rechargeable lithium secondary batteries have an energy density per unit weight that is three times higher than those of conventional lead batteries, nickel-cadmium batteries, nickel hydride batteries, and nickel-zinc batteries. Rechargeable lithium secondary batteries may also be charged at a high rate.

A cathode active material having an increased discharge capacity is used to produce a lithium secondary battery having a high energy density. The cathode active material having an increased discharge capacity has relatively low electrochemical stability. Thus, during charging/discharging of the lithium secondary battery, a side reaction occurs between the cathode active material and an electrolyte, which may reduce the stability of the lithium secondary battery. Therefore, there is a need for a method of improving the stability of a lithium secondary battery including a cathode active material while providing an increased discharge capacity.

SUMMARY

Provided is a novel electrolyte additive for a lithium battery.

Provided is an organic electrolyte solution.

Provided is a lithium battery.

Additional aspects will be set forth in part in the description which follows and, in part, will be apparent from the description, or may be learned by practice of the presented embodiments.

According to an aspect of an embodiment, an electrolyte additive for a lithium battery comprising a sulfone compound, is provided:

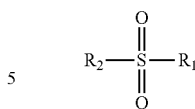

Formula 1 wherein, in Formula 1, $R_1$ is a halogen-substituted or unsubstituted C1-C5 alkyl group, a halogen-substituted or unsubstituted C4-C10 cycloalkyl group, a halogen-substituted or unsubstituted C5-C10 aryl group, or a halogen-substituted or unsubstituted C2-C10 heteroaryl group, and $R_2$ is a halogen-substituted or unsubstituted C2-C10 alkenyl group.

According to another aspect of an embodiment, an organic electrolyte solution includes:

a lithium salt;

an organic solvent; and the electrolyte additive.

According to another aspect of an embodiment, a lithium battery includes:

a cathode including a cathode active material;

an anode including an anode active material; and an organic electrolyte solution between the cathode and the anode, wherein the organic electrolyte solution includes the electrolyte additive.

BRIEF DESCRIPTION OF THE DRAWINGS

These and/or other aspects will become apparent and more readily appreciated from the following description of the embodiments, taken in conjunction with the accompanying drawings in which:

FIG. 1 is a schematic view of a lithium battery according to an embodiment.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the FIGURES, to explain aspects. As used herein, the term "and/or" includes any and all combinations of one or more of the associated listed items. Expressions such as "at least one of," when preceding a list of elements, modify the entire list of elements and do not modify the individual elements of the list.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

Furthermore, relative terms, such as "lower" or "bottom" and "upper" or "top," may be used herein to describe one element's relationship to another element as illustrated in the drawings. It will be understood that relative terms are intended to encompass different orientations of the device in addition to the orientation depicted in the drawings. For example, if the device in the drawing is turned over, elements described as being on the "lower" side of other elements would then be oriented on "upper" sides of the other elements. The exemplary term "lower," can therefore, encompasses both an orientation of "lower" and "upper," depending on the particular orientation of the drawing. Similarly, if the device in one of the drawings is turned over, elements described as "below" or "beneath" other elements would then be oriented "above" the other elements. The exemplary terms "below" or "beneath" can, therefore, encompass both an orientation of above and below.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the FIGURES are schematic in nature and their shapes are not intended to illustrate the precise shape of a region and are not intended to limit the scope of the present claims.

It will be understood that when an element is referred to as being "on" another element, it can be directly on the other element or intervening elements may be present therebetween. In contrast, when an element is referred to as being "directly on" another element, there are no intervening elements present.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, according to example embodiments, an electrolyte additive for a lithium battery, an organic electrolyte solution including the same, and a lithium battery including the same will be described.

According to an embodiment, an electrolyte additive for a lithium battery is a sulfone-based compound represented by Formula 1:

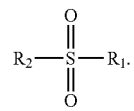

Formula 1

In Formula 1, $R_1$ may be a halogen-substituted or unsubstituted C1-C5 alkyl group, a halogen-substituted or unsubstituted C4-C10 cycloalkyl group, a halogen-substituted or unsubstituted C5-C10 aryl group, or a halogen-substituted or unsubstituted C2-C10 heteroaryl group, and $R_2$ may be a halogen-substituted or unsubstituted C2-C10 alkenyl group.

When the lithium transition metal oxide, which includes nickel and at least one transition metal other than nickel and has the nickel at an amount of 80 mol % based on the total number of moles of transition metals, is used as a cathode active material, a lithium battery having a high output and a high capacity may be manufactured. Generally, in a lithium battery, a lithium transition metal oxide having a high amount of nickel has an unstable surface structure, which increases gas generation by a side reaction during a charging/discharging process of the battery, and thus elution of a transition metal such as nickel may increase. Therefore, lifespan characteristics of the lithium battery may deteriorate.

On the other hand, in a lithium battery including the electrolyte additive according to an embodiment, an increase in initial resistance may be suppressed, gas generation due to a side reaction may be suppressed, and lifespan characteristics may improve.

For example, the sulfone-based compound represented by Formula 1 may be a sulfone-based compound represented by Formula 2:

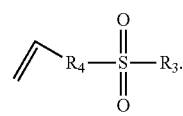

Formula 2

In Formula 2, $R_3$ may be a halogen-substituted or unsubstituted C1-C5 alkyl group or a halogen-substituted or unsubstituted C5-C10 aryl group, and $R_4$ may be a covalent bond or a C2-C10 alkenylene group.

For example, the sulfone-based compound represented by Formula 1 may be a sulfone-based compound represented by one of Formulae 3 to 9:

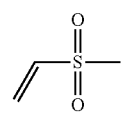

Formula 3

-continued

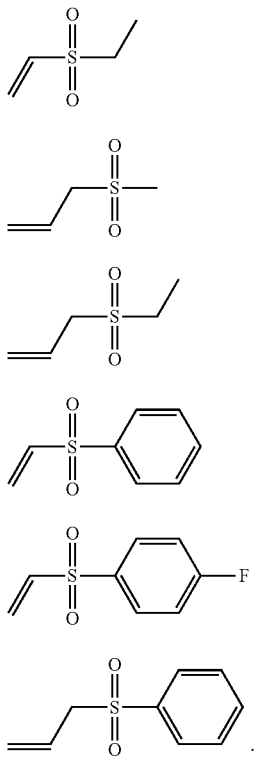

Formula 4

Formula 5

Formula 6

Formula 7

Formula 8

Formula 9

According to example embodiments, an organic electrolyte solution may include a lithium salt, an organic solvent, and the electrolyte additive.

Since the organic electrolyte solution includes the electrolyte additive for the lithium battery, an increase in initial resistance of the lithium battery including the organic electrolyte solution may be suppressed, gas generation due to a side reaction may be suppressed, and lifespan characteristics may improve.

For example, in the organic electrolyte solution, an amount of the sulfone-based compound represented by one of Formulae 1 to 9 is limited to about 3 wt % or less based on the total weight of the organic electrolyte solution, gas generation due to a side reaction may be suppressed, and lifespan characteristics may improve.

In the organic electrolyte solution, an amount of the sulfone-based compound represented by one of Formulae 1 to 9 may be in a range of about 0.1 wt % to about 3 wt %, for example, about 0.1 wt % to about 2.9 wt %, about 0.1 wt % to about 2.8 wt %, about 0.1 wt % to about 2.7 wt %, about 0.1 wt % to about 2 wt %, about 0.1 wt % to about 1.5 wt %, or about 0.2 wt % to about 1 wt %, based on the total weight of the organic electrolyte solution. When the amount of the sulfone-based compound represented by one of Formulae 1 to 9 is within these ranges, gas generation in the lithium battery may be suppressed, and the lithium battery may have excellent lifespan characteristics. Thus, gas generation may be suppressed without substantial change in the lifespan characteristics.

The organic solvent including the organic electrolyte solution may include, for example, a cyclic carbonate compound represented by Formula 17:

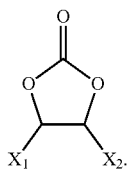

Formula 17

In Formula 17, $X_1$ and $X_2$ may each independently be a hydrogen atom or a halogen atom, and at least one of $X_1$ and $X_2$ may be fluorine (F).

When the organic solvent includes the cyclic carbonate compound represented by Formula 17, the lithium battery may have improved lifespan characteristics and the effect of suppressing resistance. For example, in the cyclic carbonate compound represented by Formula 17, $X_1$ may be hydrogen, and $X_2$ may be F.

An amount of the cyclic carbonate compound represented by Formula 17 may be 10 vol % or less, 9 vol % or less, 8 vol % or less, 7 vol % or less, 6 vol % or less, or 5 vol % or less, based on the total volume of the organic solvent. For example, the amount of the cyclic carbonate compound represented by Formula 17 may be in a range of about 0.1 vol % to about 10 vol %, about 0.1 vol % to about 9 vol %, about 0.1 vol % to about 8 vol %, about 0.1 vol % to about 7 vol %, about 0.1 vol % to about 6 vol %, or about 0.1 vol % to about 5 vol %, based on the total volume of the organic solvent. When the amount of the cyclic carbonate compound represented by Formula 17 within these ranges, the lithium battery may have improved lifespan characteristics and the effect of suppressing resistance.

The organic electrolyte solution may further include a cyclic carbonate compound represented by Formula 18:

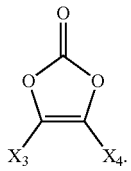

Formula 18

In Formula 18, $X_3$ and $X_4$ may be each independently a hydrogen atom, a halogen atom, or a C1-C3 alkyl group.

When the organic electrolyte solution includes the cyclic carbonate compound represented by Formula 18, the lithium battery may have improved lifespan characteristics and the effect of suppressing resistance of the lithium battery. For example, in the cyclic carbonate compound represented by Formula 18, $X_3$ and $X_4$ may each be hydrogen.

An amount of the cyclic carbonate compound represented by Formula 18 may be 3 wt % or less, for example, 2.5 wt % or less, 2 wt % or less, or about 1.5 wt % or less, based on the total weight of the organic electrolyte solution. For example, the amount of the cyclic carbonate compound represented by Formula 18 may be in a range of about 0.1 wt % to about 3 wt %, about 0.1 wt % to about 2.5 wt %, about 0.1 wt % to about 2 wt %, or about 0.1 wt % to about 1.5 wt %, based on the total weight of the organic electrolyte solution. When the amount of the cyclic carbonate compound represented by Formula 18 is within these ranges, the lithium battery may have improved lifespan characteristics and resistance suppression.

The organic solvent may be at least one selected from a carbonate-based solvent, an ester-based solvent, an ether-based solvent, and a ketone-based solvent.

Examples of the carbonate-based solvent may include ethylmethyl carbonate (EMC), methylpropyl carbonate (MPC), ethylpropyl carbonate (EPC), dimethyl carbonate (DMC), diethyl carbonate (DEC), dipropyl carbonate (DPC), propylene carbonate (PC), ethylene carbonate (EC), and butylene carbonate (BC). Examples of the ester-based solvent may include methyl propionate, ethyl propionate, ethyl butyrate, methyl acetate, ethyl acetate, n-propyl acetate, t-butyl acetate, gamma butyrolactone, decanolide, gamma valerolactone, mevalonolactone, and caprolactone. Examples of the ether-based solvent may include dibutyl ether, tetraglyme, diglyme, dimethoxyethane, 2-methyltetrahydrofuran, and tetrahydrofuran. Examples of the ketone-based solvent may include cyclohexanone. Examples of the nitrile-based solvent may include acetonitrile (AN), succinonitrile (SN), and adiponitrile. Examples of other solvents may include dimethylsulfoxide, dimethylformamide, dimethylacetamide, and tetrahydrofuran, but embodiments are not limited thereto, and any material available as an organic solvent in the art may be used. For example, the organic solvent may include about 50 vol % to about 95 vol % of straight-chain (i.e., non-cyclic) carbonate and about 5 vol % to about 50 vol % of cyclic carbonate, about 55 vol % to about 95 vol % of straight-chain carbonate and about 5 vol % to about 45 vol % of cyclic carbonate, about 60 vol % to about 95 vol % of straight-chain carbonate and about 5 vol % to about 40 vol % of cyclic carbonate, about 65 vol % to about 95 vol % of straight-chain carbonate and about 5 vol % to about 35 vol % of cyclic carbonate, or about 70 vol % to about 95 vol % of straight-chain carbonate and about 5 vol % to about 30 vol % of cyclic carbonate. For example, the organic solvent may be a solvent mixture of at least three different organic solvents.

For example, the organic electrolyte solution may include about 0.1 wt % to about 3 wt % of a sulfone-based compound represented by one of Formulae 3 to 9 and about 0.1 wt % to about 2.0 wt % of a compound represented by Formula 18a, and the organic solvent in the organic electrolyte solution may include about 1 vol % to about 10 vol % of a compound represented by Formula 17a:

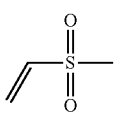

Formula 3

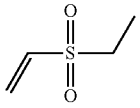

Formula 4

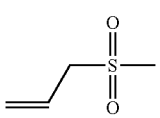

Formula 5

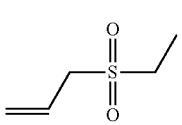

Formula 6

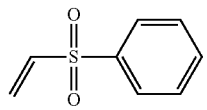

Formula 7

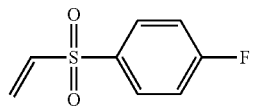

Formula 8

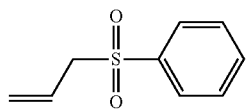

Formula 9

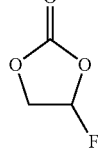

Formula 17a

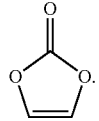

Formula 18a

The lithium salt may include at least one selected from $LiPF_6$, $LiBF_4$, $LiCF_3SO_3$, $Li(CF_3SO_2)_2N$, $LiC_2F_5SO_3$, $Li(FSO_2)_2N$, $LiC_4F_9SO_3$, $LiN(SO_2CF_2CF_3)_2$, and compounds represented by Formulae 19 to 22:

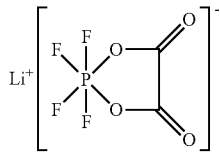

Formula 19

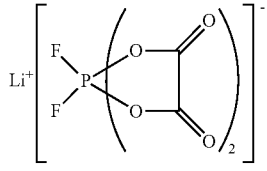

Formula 20

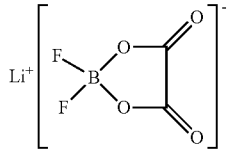

Formula 21

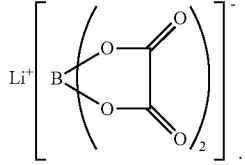

Formula 22

A concentration of the lithium salt may be in a range of about 0.01 molar (M) to about 5.0 M, for example, about 0.05 M to about 5.0 M, about 0.1 M to about 5.0 M, or about 0.1 M to about 2.0 M, but embodiments are not limited thereto, and an appropriate concentration may be used according to the need. When the concentration of the lithium salt is within these ranges, battery characteristics may improve.

The organic electrolyte solution may not include a cyclic acid anhydride such as a succinic acid anhydride. The organic electrolyte solution may not include cyclicsulfone. The organic electrolyte solution may not include cyclic sulfonate. The organic electrolyte solution may not include sultone.

According to example embodiments, a lithium battery includes: a cathode including a cathode active material; an anode including an anode active material; and an organic electrolyte solution between the cathode and the anode, wherein the organic electrolyte solution includes the electrolyte additive.

Since the lithium battery includes the electrolyte additive for the lithium battery, an increase in initial resistance of the lithium battery may be suppressed, gas generation due to a side reaction may be suppressed, and lifespan characteristics may improve. The cathode active material may include a lithium transition metal oxide including nickel and a transition metal other than nickel. In the lithium transition metal oxide including nickel and a transition metal other than nickel, an amount of nickel may be 60 mol % or more, for example, 65 mol % or more, 70 mol % or more, 75 mol % or more, 80 mol % or more, 82 mol % or more, 85 mol % or more, 87 mol % or more, or 90 mol %, based on the total number of moles of transition metals.

For example, the lithium transition metal oxide may be represented by Formula 23:

$$Li_aNi_xCo_yM_zO_{2-b}A_b \quad \text{Formula 23}$$

In Formula 23, $1.0 \leq a \leq 1.2$, $0 \leq b \leq 0.2$, $0.6 \leq x < 1$, $0 < y \leq 0.3$, $0 < z \leq 0.3$, and $x+y+z=1$; M is at least one selected from the group consisting of manganese (Mn), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), and boron (B); and A is F, S, Cl, Br, or a combination thereof. For example, x, y, and z may satisfy $0.7 \leq x < 1$, $0 < y \leq 0.3$, $0 < z \leq 0.3$, and $x+y+z=1$; $0.8 \leq x < 1$, $0 < y \leq 0.3$, $0 < z \leq 0.3$, and $x+y+z=1$; $0.8 \leq x < 1$, $0 < y \leq 0.2$, and $0 < z \leq 0.2$; $0.83 \leq x < 0.97$, $0 < y \leq 0.15$, and $0 < z \leq 0.15$; or $0.85 \leq x < 0.95$, $0 < y \leq 0.1$, and $0 < z \leq 0.1$.

For example, the lithium transition metal oxide may be a compound represented by one of Formulae 24 and 25:

$$LiNi_xCo_yMn_zO_2 \quad \text{Formula 24}$$

$$LiNi_xCo_yAl_zO_2 \quad \text{Formula 25}$$

In Formulae 24 and 25, x, y, and z may satisfy $0.65 \leq x \leq 0.95$, $0 < y \leq 0.2$, and $0 < z \leq 0.1$. For example, x, y, and z may satisfy $0.75 \leq x \leq 0.95$, $0 < y \leq 0.2$, and $0 < z \leq 0.1$. For example, x, y, and z may satisfy $0.8 \leq x \leq 0.95$, $0 < y \leq 0.2$, and $0 < z \leq 0.1$. For example, x, y, and z may satisfy $0.825 \leq x \leq 0.95$, $0 < y \leq 0.15$, and $0 < z \leq 0.15$. For example, x, y, and z may satisfy $0.85 \leq x \leq 0.95$, $0 < y \leq 0.1$, and $0 < z \leq 0.1$.

For example, the lithium transition metal oxide may be $LiNi_{0.7}Co_{0.2}Mn_{0.1}O_2$, $LiNi_{0.88}Co_{0.08}Mn_{0.04}O_2$, $LiNi_{0.8}Co_{0.15}Mn_{0.05}O_2$, $LiNi_{0.8}Co_{0.1}Mn_{0.1}O_2$, $LiNi_{0.88}Co_{0.1}Mn_{0.02}O_2$, $LiNi_{0.8}Co_{0.15}Al_{0.05}O_2$, $LiNi_{0.8}Co_{0.1}Mn_{0.2}O_2$, or $LiNi_{0.88}Co_{0.1}Al_{0.2}O_2$. A combination comprising at least two of the foregoing may be used.

The anode active material may include at least one of a silicon compound, a carbonaceous material, and a composite of a silicon compound and a carbonaceous material. For example, the silicon compound can be a silicon oxide of the formula $SiO_x$, where $0<x<2$. For example, the carbonaceous material may be graphite. In an embodiment, the silicon compound is a silicon oxide of the formula $SiO_x$ wherein $0<x<2$, and the anode active material comprises a composite of the silicon oxide and the carbonaceous material.

The composite of a silicon compound and a carbonaceous material may be a composite having a structure in which silicon nanoparticles are disposed on the carbonaceous material, a composite having silicon particles disposed on a surface and inside the carbonaceous material, or a composite having silicon particles that are coated with the carbonaceous material and thus included in the carbonaceous material.

The composite of a silicon compound and a carbonaceous material may be an active material that is obtained by dispersing silicon nanoparticles, for example having an average particle diameter of about 200 nanometers (nm) or less, on the carbonaceous material, and carbon coating the resulting particles, or an active material having silicon (Si) particles disposed on and inside graphite. An average particle diameter of the silicon nanoparticles may be about 5 nm or greater, about 10 nm or greater, about 20 nm or greater, about 50 nm or greater, or about 70 nm or greater. The average particle diameter of the silicon nanoparticles may be about 200 nm or less, about 150 nm or less, about 100 nm or less, about 50 nm or less, about 20 nm or less, or about 10 nm or less. For example, the average particle diameter of the silicon nanoparticles may be in a range of about 5 nm to about 200 nm, about 10 nm to about 150 nm, or about 100 nm to about 150 nm.

An average secondary particle diameter of the composite of a silicon compound and a carbonaceous material may be in a range of about 5 micrometers (μm) to about 20 μm. The average secondary particle diameter of the composite of a silicon compound and a carbonaceous material may be in a range of about 5 μm to about 18 μm, for example, about 7 μm to about 18 μm, about 7 μm to about 15 μm, or about 10 μm to about 13 μm. The term "average secondary particle diameter" may refer to the average diameter of the composite of the silicon compound and the carbonaceous material when the secondary particles are spherical or refer to an average length of the major axes of the particles when the secondary particles are nonspherical.

The lithium battery according to any of the embodiments may have a direct current internal resistance (DCIR) after 200 cycles of charging/discharging at 25° C. that may be about 155% or less, about 150% or less, or, for example, in a range of about 105% to about 155%, of a direct current internal resistance of the lithium battery after 1 cycle of charging and discharging.

An energy density per cell unit volume of the lithium battery may be about 500 watt hours per liter (Wh/L) or greater, about 550 Wh/L or greater, about 600 Wh/L or greater, about 650 Wh/L or greater, or about 700 Wh/L or greater. Since the lithium battery has a high cell energy density of about 500 Wh/L or greater, the lithium battery may provide a high output.

The type of the lithium battery is not particularly limited, and the lithium battery may be a lithium ion battery, a lithium ion polymer battery, or a lithium sulfur battery.

The lithium battery according to an embodiment may be manufactured in the following manner.

First, a cathode is prepared.

For example, a cathode active material, a conducting agent, a binder, and a solvent are mixed to prepare a cathode active material composition. In some embodiments, the cathode active material composition may be directly coated on a metallic current collector to prepare a cathode. In some embodiments, the cathode active material composition may be cast on a separate support to form a cathode active material film, which may then be separated from the support and laminated on a metallic current collector to prepare a cathode. The cathode is not limited to the examples described above, and may be at least one of a variety of types.

The cathode active material may be used with a general lithium-containing metal oxide in addition to the nickel-rich lithium-nickel composite oxide. In some embodiments, the lithium-containing metal oxide may be at least two of a composite oxide of lithium with a metal selected from among Co, Mn, Ni, and a combination thereof. In some embodiments, the cathode active material may be a compound represented by at least one of the following formulae:

$Li_aA_{1-b}B'_bD'_2$ (where $0.90 \le a \le 1.8$, and $0 \le b \le 0.5$); $Li_aE_{1-b}B'_bO_{2-c}D'_c$ (where $0.90 \le a \le 1.8$, $0 \le b \le 0.5$, and $0 \le c \le 0.05$); $LiE_{2-b}B'_bO_{4-c}D'_c$ (where $0 \le b \le 0.5$, and $0 \le c \le 0.05$); $Li_aNi_{1-b-c}Co_bB'_cD'_\alpha$ (where $0.90 \le a \le 1.8$, $0 \le b \le 0.5$, $0 \le c \le 0.05$, and $0 < \alpha \le 2$); $Li_aNi_{1-b-c}Co_bB'_cO_{2-\alpha}F_\alpha$ (where $0.90 \le a \le 1.8$, $0 \le b \le 0.5$, $0 \le c \le 0.05$, and $0 < \alpha < 2$); $Li_aNi_{1-b-c}Co_bB'_cO_{2-\alpha}F'_2$ (where $0.90 \le a \le 1.8$, $0 \le b \le 0.5$, $0 \le c \le 0.05$, and $0 < \alpha < 2$); $Li_aNi_{1-b-c}Mn_bB'_cD'_\alpha$ (where $0.90 \le a \le 1.8$, $0 \le b \le 0.5$, $0 \le c \le 0.05$, and $0 < \alpha \le 2$); $Li_aNi_{1-b-c}Mn_bB'_cO_{2-\alpha}F_\alpha$ (where $0.90 \le a \le 1.8$, $0 \le b \le 0.5$, $0 \le c \le 0.05$, and $0 < \alpha < 2$); $Li_aNi_{1-b-c}Mn_bB'_cO_{2-\alpha}F'_2$ (where $0.90 \le a \le 1.8$, $0 \le b \le 0.5$, $0 \le c \le 0.05$, and $0 < \alpha < 2$); $Li_aNi_bE_cG_dO_2$ (where $0.90 \le a \le 1.8$, $0 \le b \le 0.9$, $0 \le c \le 0.5$, and $0.001 \le d \le 0.1$); $Li_aNi_bCo_cMn_dG_eO_2$ (where $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1.8$, and $0.001 \le b \le 0.1$); $Li_aCoG_bO_2$ (where $0.90 \le a \le 1.8$, and $0.001 \le b \le 0.1$); $Li_aMnG_bO_2$ (where $0.90 \le a \le 1.8$, and $0.001 \le b \le 0.1$); $Li_aMn_2G_bO_4$ (where $0.90 \le a \le 1.8$, and $0.001 \le b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \le f \le 2$); $Li_{(3-f)}Fe_2(PO_4)_3$ (where $0 \le f \le 2$); and $LiFePO_4$.

In the formulae above, A may be selected from nickel (Ni), cobalt (Co), manganese (Mn), and combinations thereof; B' may be selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D' may be selected from oxygen (O), fluorine (F), sulfur (S), phosphorus (P), and combinations thereof; E may be selected from cobalt (Co), manganese (Mn), and combinations thereof; F' may be selected from fluorine (F), sulfur (S), phosphorus (P), and combinations thereof; G may be selected from aluminum (Al), chromium (Cr), manganese (Mn), iron (Fe), magnesium (Mg), lanthanum (La), cerium (Ce), strontium (Sr), vanadium (V), and combinations thereof; Q is selected from titanium (Ti), molybdenum (Mo), manganese (Mn), and combinations thereof; I' is selected from chromium (Cr), vanadium (V), iron (Fe), scandium (Sc), yttrium (Y), and combinations thereof; and J may be selected from vanadium (V), chromium (Cr), manganese (Mn), cobalt (Co), nickel (Ni), copper (Cu), and combinations thereof.

In an embodiment, the cathode active material may be $LiCoO_2$, $LiMn_xO_{2x}$ (where $x=1$ or $2$), $LiNi_{1-x}Mn_xO_{2x}$ (where $0<x<1$), $LiNi_{1-x-y}Co_xMn_yO_2$ (where $0 \le x \le 0.5$, $0 \le y \le 0.5$, and $1-x-y>0.5$), or $LiFePO_4$.

The compounds listed above as cathode active materials may have a surface coating layer (hereinafter, also referred to as "coating layer"). Alternatively, a mixture of a compound without a coating layer and a compound having a coating layer, the compounds being selected from the compounds listed above, may be used. In some embodiments, the coating layer may include at least one compound of a coating element selected from the group consisting of oxide, hydroxide, oxyhydroxide, oxycarbonate, and hydroxycarbonate of the coating element. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In an embodiment, the coating layer may be formed using any suitable method that does not adversely affect the physical properties of the cathode active material when a coating element compound is used. For example, the coating layer may be formed using a spray coating method, or a dipping method. The coating methods may be well understood by one of ordinary skill in the art, and thus a detailed description thereof will be omitted.

The conducting agent may be any suitable material that does not cause chemical changes in the lithium metal battery and has conductivity. Non-limiting examples of the conducting agent may include graphite such as natural graphite or artificial graphite; a carbonaceous material such as carbon black, acetylene black, Ketjen black, channel black, furnace black, lamp black, or thermal black; conductive fibers such as carbonaceous fibers or metal fibers; fluorinated carbon; a metal powder such as an aluminum powder or a nickel powder; conductive whisky, such as zinc oxide or potassium titanate; a conductive metal oxide, such as a titanium oxide; and a conductive material, such as a polyphenylene derivative.

The amount of the conducting agent may be in a range of about 1 wt % to about 20 wt % based on the total weight of the cathode active material composition.

The binder contributes in binding of the active material and the conducting agent and binding of the active material to the current collector, and an amount of the binder may be in a range of about 1 wt % to about 30 wt % based on the total weight of the cathode active material composition. Non-limiting examples of the binder may include various co-polymers such as polyvinylidene fluoride (PVdF), polyvinylidene chloride, polybenzimidazole, polyimide, polyvinyl acetate, polyacrylonitrile, polyvinyl alcohol, carboxymethylcellulose (CMC), starch, hydroxypropylcellulose, reproduced cellulose, polyvinylpyrrolidone, polyethylene, polypropylene, polystyrene, polymethyl methacrylate, polyaniline, acrylonitrile butadiene styrene, phenol resin, epoxy resin, polyethylene terephthalate, polytetrafluoroethylene, polyphenylene sulfide, polyamideimide, polyetherimide, polyethylene sulfone, polyamide, polyacetal, polyphenylene oxide, polybutylene terephthalate, ethylene-propylene-diene monomer (EPDM), sulfonated EPDM, styrene butadiene rubber (SBR), fluorine rubber, and various suitable copolymers.

Non-limiting examples of the solvent may include N-methylpyrrolidone (NMP), acetone, and water, but embodiments are not limited thereto, and any suitable material, including those available as a solvent in the art, may be used. An amount of the solvent may be in a range of about 10 parts to about 100 parts by weight based on 100 parts by weight of the cathode active material. When the amount of the solvent is within this range, an active material layer may be formed.

The amounts of the cathode active material, the conducting agent, the binder, and the solvent may be in ranges that are commonly used in lithium secondary batteries.

At least one of the conducting agent, the binder, and the solvent may be omitted according to the use and the structure of the lithium battery.

For example, NMP may be used as a solvent, PVdF or a PVdF co-polymer may be used as a binder, and carbon black and acetylene black may be used as a conducting agent. For example, about 94 wt % of the cathode active material, about 3 wt % of the binder, and about 3 wt % of the conducting agent may be mixed in the powder form, and NMP may be added thereto so that an amount of solid in the mixture is about 70 wt %, thereby preparing a slurry. Then, the slurry may be coated, dried, and press-rolled on a cathode current collector to prepare a cathode.

The thickness of the cathode current collector may be in a range of about 3 µm to about 50 µm, and is not particularly limited, and may be any of various suitable current collectors that do not cause a chemical change to a battery and has conductivity. Examples of the cathode current collector may include stainless steel, aluminum, nickel, titanium, calcined carbon, and aluminum or stainless steel that are surface-treated with carbon, nickel, titanium, or silver. The cathode current collector may have an uneven microstructure at its surface to enhance a binding force with the cathode active material. Also, the cathode current collector may be in various forms including a film, a sheet, a foil, a net, a porous body, a foaming body, and a non-woven body.

A loading level of the cathode active material composition thus prepared may be about 30 milligrams per square centimeter (mg/cm$^2$) or greater, for example, about 35 mg/cm$^2$ or greater, or about 40 mg/cm$^2$ or greater. An electrode density may be about 3 grams per cubic centimeter (g/cc) or greater, for example, about 3.5 g/cc or greater. For a design focused on an energy density, a loading level from about 35 milligrams per square meter (mg/cm$^2$) or greater to about 50 mg/cm$^2$ or less and a density from about 3.5 g/cc or greater to about 4.2 g/cc or less may be selected. For example, a two-surface (double side) coated cathode may be prepared at a loading level of about 37 mg/cm$^2$ and a density of about 3.6 g/cc.

When the loading level and the electrode density of the cathode active material are within these ranges above, a battery including the cathode active material may exhibit a high cell energy density of about 50 Wh/L or greater. Also, the lithium battery may have a DCIR after 200 cycles of charging/discharging at 45° C. that is about 165% or less than a DCIR of the lithium battery after 1 cycle of charging and discharging.

Next, an anode is prepared.

For example, an anode active material, a conducting agent, a binder, and a solvent are mixed to prepare an anode active material composition. In some embodiments, the anode active material composition may be directly coated on a metallic current collector and dried to prepare an anode. In some embodiments, the anode active material composition may be cast on a separate support to form an anode active material film, which may then be separated from the support and laminated on a metallic current collector to prepare an anode.

In an embodiment, the anode active material may be a silicon compound, for example a silicon oxide (SiO$_x$, where 0<x<2), a carbonaceous material, or a composite of a silicon compound and a carbonaceous material. Here, a size of silicon particles (e.g., an average particle diameter) may be less than about 200 nanometers (nm), or, for example, in a range of about 10 nm to about 150 nm. The term "size" or "particle size" used herein may refer to an average particle diameter when the silicon particles are spherical or may refer to an average longitudinal length of the major axes of particles when the silicon particles are non-spherical.

When the size of the silicon particles is within these ranges above, lifespan characteristics may be excellent, and thus a lithium secondary battery including the electrolyte according to an embodiment may have improved lifespan.

Examples of the carbonaceous material may include crystalline carbon, amorphous carbon, or mixture thereof. Examples of the crystalline carbon are graphite, such as natural graphite or artificial graphite that are in shapeless (non-shaped), plate, flake, spherical, or fibrous form. Examples of the amorphous carbon are soft carbon (carbon sintered at low temperatures), hard carbon, meso-phase pitch carbides, and sintered cokes.

Examples of the composite of a silicon compound and a carbonaceous material may include a composite having silicon nanoparticles on graphite or a composite having silicon particles on and inside graphite. The composite may be an active material that is obtained by dispersing silicon (Si) nanoparticles having an average particle diameter of about 200 nm or less, for example, in a range of about 100 nm to about 200 nm, or about 150 nm, on graphite particles, and carbon-coating the resulting particles or an active material having Si particles existing on and inside the graphite. Such composites may be obtained under the product name SCN1 (Si particles disposed on graphite) or SCN2 (Si particles disposed inside as well as on graphite). SCN1 is an active material obtained by dispersing Si particles having an average particle diameter of about 150 nm on graphite particles and carbon-coating the resulting particles. SCN2 is an active material including Si particles having an average particle diameter of about 150 nm on and inside graphite.

In an embodiment, the anode active material may further include any suitable anode active material for a lithium secondary battery, including those available in the art, which may be used together with the anode active material described above. For example, the anode active material may be Si, Sn, Al, Ge, Pb, Bi, Sb, a Si—Y' alloy (wherein Y' is an alkali metal, an alkali earth metal, a Group XIII element, a Group XIV element, a transition metal, a rare earth element, or a combination thereof, and Y' is not Si), and a Sn—Y' alloy (wherein Y' is an alkali metal, an alkali earth metal, a Group XIII element, a Group XIV element, a transition metal, a rare earth element, or a combination thereof, and Y' is not Sn). In another embodiment, Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or combinations thereof.

For example, the anode active material may be a lithium titanium oxide, a vanadium oxide, a lithium vanadium oxide, or the like.

In an embodiment, the conducting agent and the binder used for the anode active material composition may be the same as those used for the cathode active material composition.

In the anode active material composition, water may be used as a solvent. For example, water may be used as a solvent; CMC, SBR, an acrylate-based polymer, or a methacrylate-based polymer may be used as a binder; and carbon black, acetylene black, or graphite may be used as a conducting agent.

The amounts of the anode active material, the conducting agent, the binder, and the solvent may be in ranges that are suitably used in lithium secondary batteries. At least one of the conducting agent, the binder, and the solvent may be omitted according to the use and the structure of the lithium battery.

For example, about 94 wt % of the anode active material, about 3 wt % of the binder, and about 3 wt % of the conducting agent may be mixed in the powder form, and water may be added thereto so that an amount of solid in the mixture is about 70 wt %, thereby preparing a slurry. Then, the slurry may be coated, dried, and press-rolled on an anode current collector to prepare an anode.

The thickness of the anode current collector may be in a range of about 3 μm to about 50 μm, and may be any of various suitable current collectors that do not cause a chemical change to a battery and has conductivity. Examples of the anode current collector may include copper, stainless steel, aluminum, nickel, titanium, calcined carbon, copper or stainless steel that are surface-treated with carbon, nickel, titanium, or silver, and an aluminum-cadmium alloy. The anode current collector may have an uneven microstructure at its surface to enhance a binding force with the cathode active material. The cathode current collector may be of various forms including a film, a sheet, a foil, a net, a porous body, a foaming body, and a non-woven body.

The loading level of the anode active material composition may be determined according to the loading level of the cathode active material composition. For example, the loading level of the anode active material composition may be about 12 mg/cm$^2$ or greater, for example, about 15 mg/cm$^2$ or greater, according to a capacity per gram (g) of the anode active material composition. An electrode density may be about 1.5 g/cc or greater, for example, about 1.6 g/cc or greater. For a design focused on an energy density, the anode may have a density from about 1.65 g/cc or greater to about 1.9 g/cc or less.

When the loading level and the electrode density of the anode active material are within these ranges above, a battery including the anode active material may exhibit a high cell energy density of about 500 Wh/L or higher.

Next, a separator that may be inserted or disposed between the cathode and the anode is prepared.

The separator may be any suitable separator that is used in lithium batteries. In an embodiment, the separator may have low resistance to migration of ions in an electrolyte and have an excellent electrolyte-retaining ability. Examples of the separator are glass fiber, polyester, Teflon, polyethylene, polypropylene, polytetrafluoroethylene (PTFE), or a combination thereof, each of which may be a non-woven fabric or a woven fabric. For example, a rollable separator including polyethylene or polypropylene may be used for a lithium ion battery. A separator with a good electrolytic-retaining ability may be used for a lithium ion polymer battery. For example, the separator may be manufactured in the following manner.

In an embodiment, a polymer resin, a filler, and a solvent may be mixed together to prepare a separator composition. Then, the separator composition may be directly coated on an electrode, and then dried to form the separator. In another embodiment, the separator composition may be cast on a support and then dried to form a separator film, which may then be separated from the support and laminated on an electrode to form the separator.

The polymer resin used to manufacture the separator may be any material that is commonly used as a binder for electrode plates. Examples of the polymer resin are a vinylidenefluoride/hexafluoropropylene copolymer, polyvinylidene fluoride (PVDF), polyacrylonitrile, polymethylmethacrylate, or a mixture thereof.

Then, an electrolyte is prepared.

In one embodiment, the electrolyte may further include an aqueous electrolyte solution, a solid organic electrolyte, and an inorganic solid electrolyte, in addition to the organic electrolyte solution described above.

Examples of the organic solid electrolyte may include polyethylene derivatives, polyethylene oxide derivatives, polypropylene oxide derivatives, phosphoric acid ester polymers, polyester sulfide, polyvinyl alcohols, polyvinylidene fluoride, and polymers containing ionic dissociation groups.

Examples of the inorganic solid electrolyte may include $Li_3N$, $LiI$, $Li_5NI_2$, $Li_3N$—$LiI$—$LiOH$, $LiSiO_4$, $Li_2SiS_3$, $Li_4SiO_4$, $Li_4SiO_4$—$LiI$—$LiOH$, or $Li_3PO_4$—$Li_2S$—$SiS_2$.

Referring to FIG. 1, a lithium secondary battery 1 includes a cathode 3, an anode 2, and a separator 4. In an embodiment, the cathode 3, the anode 2, and the separator 4 may be wound or folded, and then sealed in a battery case 5. In another embodiment, the battery case 5 may be filled with an electrolyte solution and sealed with a cap assembly 6, thereby completing the manufacture of the lithium secondary battery 1. In still another embodiment, the battery case 5 may be a cylindrical type, a rectangular type, or a thin-film type. For example, the lithium secondary battery 1 may be a thin-film type battery. In some embodiments, the lithium secondary battery 1 may be a lithium ion battery.

In an embodiment, the separator 4 may be disposed between the cathode 3 and the anode 2 to form a battery assembly 1. In another embodiment, the battery assembly may be stacked in a bi-cell structure and impregnated with the organic electrolytic solution. In still another embodiment, the resultant assembly may be put into a pouch and hermetically sealed, thereby completing the manufacture of a lithium ion polymer battery.

In an embodiment, a plurality of battery assemblies may be stacked to form a battery pack, which may be used in any device that requires high capacity and high output, for example, in a laptop computer, a smart phone, or an electric vehicle.

The lithium secondary battery according to an embodiment may have a significantly reduced increase in DCIR after 200 cycles of charging and discharging, compared to that of a lithium secondary battery including a conventional nickel-rich lithium nickel composite oxide as a cathode active material, and thus may exhibit excellent battery characteristics.

For example, a driving voltage (i.e., operating voltage) of the lithium secondary battery including the cathode, the anode, and the organic electrolyte solution according to an embodiment may have a lower limit of about 2.5 volts (V) to about 2.8 V and an upper limit of about 4.1 V to about 4.4 V, and the lithium secondary battery may have an excellent energy density of, for example, about 500 Wh/L or greater.

The lithium secondary battery may be used in a power tool; an xEV such as electric vehicle (EV), hybrid electric vehicle (HEV), and plug-in hybrid electric vehicle (PHEV); electric bicycles such as E-bike or E-scooter; an electric golf cart; or an electric power storage system that operate as they are powered by an electric motor.

As used herein, the term "alkyl" refers to a fully saturated branched or unbranched (or straight-chained or linear) hydrocarbon group. Non-limiting examples of the alkyl group include a methyl group, an ethyl group, an n-propyl group, an isopropyl group, an n-butyl group, an isobutyl group, a sec-butyl group, an n-pentyl group, an isopentyl group, a neopentyl group, an n-hexyl group, a 3-methyl-hexyl group, a 2,2-dimethylpentyl group, a 2,3-dimethylpentyl, and an n-heptyl group.

At least one hydrogen atom of the alkyl group may be substituted with a C1-C20 alkyl group substituted with a halogen atom (e.g., $CCF_3$, $CHCF_2$, $CH_2F$, or $CCl_3$), a C1-C20 alkoxy group, a C2-C20 alkoxyalkyl group, a hydroxyl group, a nitro group, a cyano group, an amino group, an amidino group, a hydrazine, a hydrazone, a carboxyl group or a salt thereof, a sulfonyl group, a sulfamoyl group, a sulfonic acid group or a salt thereof, a phosphoric acid or a salt thereof, a C1-C20 alkyl group, a C2-C20 alkenyl group, a C2-C20 alkynyl group, a C1-C20 heteroalkyl group, a C6-C20 aryl group, a C7-C20 arylalkyl group, a C3-C20 heteroaryl group, a C4-C20 heteroarylalkyl group, a C3-C20 heteroaryloxy group, a C4-C20 heteroaryloxyalkyl group, or a C4-C20 heteroarylalkyl group.

As used herein, the term "halogen" refers to fluorine, bromine, chlorine, or iodine.

As used herein, the term "alkoxy" refers to "alkyl-O—", and the alkyl is the same as defined above. Non-limiting examples of the alkoxy group may include a methoxy group, an ethoxy group, a 2-propoxy group, a butoxy group, a t-butoxy group, a pentyloxy group, and a hexyloxy group. At least one hydrogen atom of the alkoxy group may be substituted with any of the substituents described above that may be substituted in place of at least one hydrogen of the alkyl group.

As used herein, the term "alkenyl" refers to a branched or unbranched hydrocarbon group having at least one carbon-carbon double bond. Non-limiting examples of the alkenyl group may include a vinyl group, an allyl group, a butenyl group, a propenyl group, and an isobutenyl group. At least one hydrogen atom of the alkenyl group may be substituted with any of the substituents described above that may be substituted in place of at least one hydrogen of the alkyl group.

As used herein, the term "alkynyl" refers to a branched or unbranched hydrocarbon group having at least one carbon-carbon triple bond. Non-limiting examples of the alkynyl group may include an ethynyl group, a butynyl group, an isobutynyl group, and an isopropynyl group. At least one hydrogen atom of the alkynyl group may be substituted with any of the substituents described above that may be substituted in place of at least one hydrogen of the alkyl group.

As used herein, the term "aryl" refers to a group with an aromatic ring optionally fused with at least one carbocyclic group. Non-limiting examples of the aryl group may include a phenyl group, a naphthyl group, and a tetrahydronaphthyl group. Also, at least one hydrogen atom of the aryl group may be substituted with any of the substituents described above that may be substituted in place of at least one hydrogen of the alkyl group.

The term "arylalkyl" refers to an alkyl group in which one of the hydrogens is substituted with an aryl group. Examples of the arylalkyl group are benzyl groups.

As used herein, the term "aryloxy" indicates "—O-aryl". A non-limiting example of the aryloxy group is phenoxy. At least one hydrogen atom of the "aryloxy" group may be substituted with any of the substituents recited above that may be substituted in place of at least one hydrogen atom of the alkyl group.

As used herein, the term "heteroaryl" refers to a monocyclic or bicyclic organic group that contains one or more heteroatoms selected from N, O, P, and S, and wherein the remaining ring atoms are carbon atoms. The heteroaryl group may include, for example, 1 to 5 heteroatoms, and in an embodiment, may include a five- to ten-membered ring. In the heteroaryl group, S or N may be present in various oxidized forms having various oxidation states. At least one hydrogen atom of the "heteroaryl" group may be substituted with any of the substituents recited above that may be substituted in place of at least one hydrogen atom of the alkyl group.

Non-limiting examples of the heteroaryl group may include a thienyl group, a furyl group, a pyrrolyl group, an imidazolyl group, a pyrazolyl group, a thiazolyl group, an isothiazolyl group, a 1,2,3-oxadiazolyl group, a 1,2,4-oxadiazolyl group, a 1,2,5-oxadiazolyl group, a 1,3,4-oxadiazolyl group, a 1,2,3-thiadiazolyl group, a 1,2,4-thiadiazolyl group, a 1,2,5-thiadiazolyl group, a 1,3,4-thiadiazolyl group, an isothiazol-3-yl group, an isothiazol-4-yl group, an isothiazol-5-yl group, an oxazol-2-yl group, an oxazol-4-yl group, an oxazol-5-yl group, an isooxazol-3-yl group, an isooxazol-4-yl group, an isooxazol-5-yl group, a 1,2,4-triazol-3-yl group, a 1,2,4-triazol-5-yl group, a 1,2,3-triazol-4-yl group, a 1,2,3-triazol-5-yl group, a tetrazolyl group, a pyrid-2-yl group, a pyrid-3-yl group, a 2-pyrazin-2-yl group, a pyrazin-4-yl group, a pyrazin-5-yl group, a 2-pyrimidin-2-yl group, a 4-pyrimidin-2-yl group, and a 5-pyrimidin-2-yl group.

As used herein, the term "heteroaryl" may indicate a group in which a heteroaromatic ring is optionally fused to one or more of an aryl group, a cycloaliphatic group, or a heterocyclic group.

The term "heteroarylalkyl" refers to an alkyl group substituted with a heteroaryl group. At least one hydrogen atom of the heteroarylalkyl group may be substituted with any of the substituents recited above that may be substituted in place of at least one hydrogen atom of the alkyl group.

The term "heteroaryloxy" indicates "—O-heteroaryl". At least one hydrogen atom of the heteroaryloxy group may be substituted with any of the substituents that are the same as those recited above in conjunction with the alkyl group.

The term "heteroaryloxyalkyl" group refers to an alkyl group substituted with a heteroaryloxy group. At least one hydrogen atom of the heteroaryloxyalkyl group may be substituted with any of the substituents recited above that may be substituted in place of at least one hydrogen atom of the alkyl group.

As used herein, the term "carbocyclic" group indicates a saturated or partially unsaturated non-aromatic monocyclic, bicyclic, or tricyclic hydrocarbon group. Non-limiting examples of the monocyclic hydrocarbon group include cyclopentyl, cyclopentenyl, cyclohexyl, and cyclohexcenyl. Non-limiting examples of the bicyclic hydrocarbon group include bornyl, decahydronaphthyl, bicyclo[2.1.1]hexyl, bicyclo[2.2.1]heptyl, bicyclo[2.2.1]heptenyl, or bicyclo[2.2.2]octyl. An example of the tricyclic hydrocarbon group is adamantyl. At least one hydrogen atom of the "carbocyclic group" may be substituted with any of the substituents recited above that may be substituted in place of at least one hydrogen atom of the alkyl group.

As used herein, the term "heterocyclic group" indicates a five- to ten-membered cyclic hydrocarbon group including at least one heteroatom such as N, S, P, or O. An example of the heterocyclic group is pyridyl. At least one hydrogen atom in the heterocyclic group may be substituted with any of the substituents recited above that may be substituted in place of at least one hydrogen atom of the alkyl group.

The term "sulfonyl" indicates R"—SO$_2$—, wherein R" is a hydrogen atom, alkyl, aryl, heteroaryl, aryl-alkyl, heteroaryl-alkyl, alkoxy, aryloxy, cycloalkyl, or a heterocyclic group.

The term "sulfamoyl group" refers to H$_2$NS(O$_2$)—, alkyl-NHS(O$_2$)—, (alkyl)$_2$NS(O$_2$)—, aryl-NHS(O$_2$)—, alkyl-(aryl)-NS(O$_2$)—, (aryl)$_2$NS(O)$_2$, heteroaryl-NHS(O$_2$)—, (aryl-alkyl)-NHS(O$_2$)—, or (heteroaryl-alkyl)-NHS(O$_2$)—. At least one hydrogen atom of the sulfamoyl group may be substituted with any of the substituents recited above that may be substituted in place of at least one hydrogen atom of the alkyl group.

The term "amino group" indicates a group with a nitrogen atom covalently bonded to at least one carbon or heteroatom. "Amino" has the general formula —N(R)$_2$, wherein each R is independently hydrogen, a C1 to C6 alkyl, or a C6 to C12 aryl. The amino group may include, for example, —NH$_2$ and substituted moieties. The term "amino group" also refers to an "alkylamino group" with nitrogen bonded to at least one additional alkyl group, and "arylamino" and "diarylamino" groups with nitrogen bonded to one or two aryl groups, respectively.

Hereinafter, one or more embodiments will be described in detail with reference to the following examples and comparative examples. These examples are only for illustrative purposes are not intended to limit the scope of the one or more embodiments of the present disclosure.

EXAMPLES

Preparation of Organic Electrolyte Solution

Preparation Example 1: 1.15 M of LiPF$_6$ and 1 wt % of APS (E1)

1.5 wt % of a compound represented by Formula 18a (vinylene carbonate, VC) and 1 weight percent (wt %) of a compound represented by Formula 9 (allyl phenyl sulfone, APS) were added to a non-aqueous organic solvent prepared by mixing a compound represented by Formula 17a (fluoroethylene carbonate), ethylene carbonate (EC), ethylmethyl carbonate (EMC), and dimethyl carbonate (DMC) at a volume ratio of 5:20:35:40, and 1.15 M of LiPF$_6$ was used as a lithium salt to prepare an organic electrolyte solution:

Formula 9
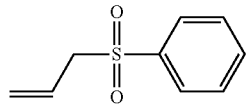

Formula 17a
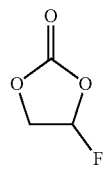

Formula 18a
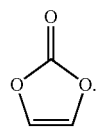

Comparative Preparation Example 1: 1.15 M of LiPF$_6$ and 1 wt % of TMP (E1)

An organic electrolyte solution was prepared in the same manner as in Preparation Example 1, except that 1 wt % of trimethyl phosphate (TMP) was used instead of 1 wt % of the compound represented by Formula 9.

Comparative Preparation Example 2: 1.3 M of LiPF$_6$, 1 wt % of DVSF, and 0 wt % of VC (E4)

1 wt % of a compound represented by Formula 10 (divinyl sulfone, DVSF) was added to a non-aqueous organic solvent prepared by mixing a compound represented by Formula 17a, EC, EMC, and DMC at a volume ratio of 5:20:35:40, and 1.3 M of LiPF$_6$ was used as a lithium salt to prepare an organic electrolyte solution: VC was not included.

Formula 10
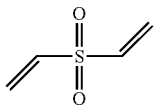

Formula 17a
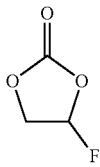

Preparation Example 2: 1.3 M of LiPF$_6$, 1 wt % of AMS, and 0 wt % of VC (E4)

An organic electrolyte solution was prepared in the same manner as in Comparative Preparation Example 2, except that 1 wt % of a compound represented by Formula 5 (allyl methyl sulfone, AMS) was used instead of the compound represented by Formula 10. VC was not included.

Formula 5
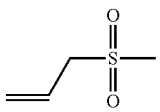

Preparation Example 3: 1.3 M of LiPF$_6$, 1 wt % of MVS, and 0 wt % of VC (E4)

An organic electrolyte solution was prepared in the same manner as in Comparative Preparation Example 2, except that 1 wt % of a compound represented by Formula 3 (methyl vinyl sulfone, MVS) was used instead of the compound represented by Formula 10: VC was not included.

Formula 3
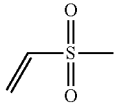

Preparation Example 4: 1.3 M of LiPF$_6$, 1 wt % of EVS, and 0 wt % of VC (E4)

An organic electrolyte solution was prepared in the same manner as in Comparative Preparation Example 2, except that 1 wt % of a compound represented by Formula 4 (ethyl vinyl sulfone, EVS) was used instead of the compound represented by Formula 10: VC was not included.

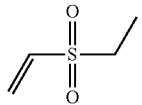

Formula 4

Preparation Example 5: 1.3 M of LiPF$_6$, 1 wt % of PVS, and 0 wt % of VC (E4)

An organic electrolyte solution was prepared in the same manner as in Comparative Preparation Example 2, except that 1 wt % of a compound represented by Formula 7 (phenyl vinyl sulfone, PVS) was used instead of the compound represented by Formula 10: VC was not included.

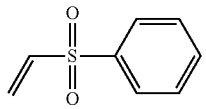

Formula 7

Comparative Preparation Example 3: 1.3 M of LiPF$_6$, 0 wt % of DVSF, and 0 wt % of VC (E4)

An organic electrolyte solution was prepared in the same manner as in Comparative Preparation Example 2, except that the compound represented by Formula 10 was not added. VC was not included.

Preparation Example 6: 1.0 M of LiPF$_6$, 1 wt % of APS, and 0 wt % of VC (E5)

1 wt % of a compound represented by Formula 9 was added to a non-aqueous organic solvent prepared by mixing a compound represented by Formula 17a, EC, EMC, and DMC at a volume ratio of 5:20:35:40, and 1.0 M of LiPF$_6$ was used as a lithium salt to prepare an organic electrolyte solution: VC was not included.

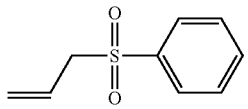

Formula 9

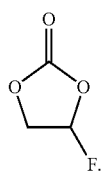

Formula 17a

Preparation Example 7: 1.0 M of LiPF$_6$, 1 wt % of AMS, and 0 wt % of VC (E5)

An organic electrolyte solution was prepared in the same manner as in Preparation Example 6, except that 1 wt % of a compound represented by Formula 5 (AMS) was used instead of the compound represented by Formula 9: VC was not included.

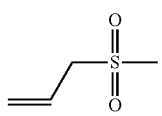

Formula 5

Preparation Example 8: 1.0 M of LiPF$_6$, 1 wt % of MVS, and 0 wt % of VC (E5)

An organic electrolyte solution was prepared in the same manner as in Preparation Example 6, except that 1 wt % of a compound represented by Formula 3 (MVS) was used instead of the compound represented by Formula 9: VC was not included.

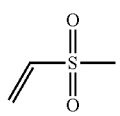

Formula 3

Preparation Example 9: 1.0 M of LiPF$_6$, 1 wt % of EVS, and 0 wt % of VC (E5)

An organic electrolyte solution was prepared in the same manner as in Preparation Example 6, except that 1 wt % of a compound represented by Formula 4 (EVS) was used instead of the compound represented by Formula 9: VC was not included.

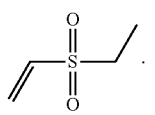

Formula 4

Preparation Example 10: 1.0 M of LiPF$_6$, 1 wt % of PVS, and 0 wt % of VC (E5)

An organic electrolyte solution was prepared in the same manner as in Preparation Example 6, except that 1 wt % of a compound represented by Formula 7 (PVS) was used instead of the compound represented by Formula 9: VC was not included.

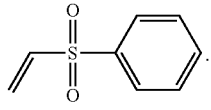

Formula 7

Comparative Preparation Example 4: 1.0 M of LiPF$_6$, 1 wt % of DVSF, and 0 wt % of VC (E5)

An organic electrolyte solution was prepared in the same manner as in Preparation Example 6, except that 1 wt % of a compound represented by Formula 10 was used instead of the compound represented by Formula 9: VC was not included.

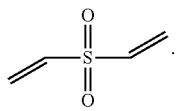

Formula 10

(Preparation of Lithium Battery (Full Cell))

Example 1: Preparation of Lithium Secondary Battery (Full Cell), Anode=Graphite (Gr)

(Preparation of Cathode)

93.0 wt % of LiNi$_{0.88}$Co$_{0.08}$Mn$_{0.04}$O$_2$ as a cathode active material, 4.0 wt % of acetylene black (Denka Black, available from DENKA CORP.) as a conducting agent, and 3.0 wt % of PVDF (Solef 6020, available from Solvay) as a binder were mixed to prepare a mixture. The mixture was added to N-methyl-2-pyrrolidone (NMP) as a solvent so that a solid content was 70%, and the solid was dispersed in the solvent for 30 minutes by using a mechanical stirrer to prepare a cathode active material composition. The cathode active material composition was two-surface coated on an aluminum foil current collector having a thickness of 12 microns (μm) by using a 3-roll coater at a loading level of 37 milligrams per square centimeter (mg/cm$^2$), dried in a hot-air drier at 100° C. for 0.5 hours, dried again in vacuum at 120° C. for 4 hours, and roll-pressed to prepare a cathode in which a cathode active material layer having a density of 3.6 grams per cubic centimeter (g/cc) μm was formed on the current collector.

(Preparation of Anode)

97 wt % of graphite powder (MC20, at a purity of 99.9% or higher, available from Mitsubishi Chemical) as an anode active material, 1.5 wt % of SBR as a binder, and 1.5 wt % of CMC were mixed to prepare a mixture. The mixture was added to NMP as a solvent so that a solid content was 70%, and the solid was dispersed in the solvent for 60 minutes by using a mechanical stirrer to prepare an anode active material composition. The anode active material composition was two-surface coated on a copper foil current collector having a thickness of 10 μm by using a 3-roll coater at a loading level of 21.87 mg/cm$^2$, dried in a hot-air drier at 100° C. for 0.5 hours, dried again in vacuum at 120° C. for 4 hours, and roll-pressed to prepare an anode in which an anode active material layer having a density of 1.65 g/cc was formed on the current collector.

(Assembly of Lithium Battery)

The cathode and the anode thus prepared, a polyethylene separator, and the electrolyte solution prepared in Preparation Example 1 as an electrolyte solution were used to prepare a 18650 cylindrical type lithium battery.

Comparative Example 1

A lithium battery was prepared in the same manner as in Example 1, except that the organic electrolyte solution prepared in Comparative Preparation Example 1 was used instead of the organic electrolyte solution prepared in Preparation Example 1.

Comparative Example 2

A lithium battery was prepared in the same manner as in Example 1, except that 83.5 parts by weight of a graphite powder (MC20, at a purity of 99.9% or higher, available from Mitsubishi Chemical) and 12.5 parts by weight of a carbon-silicon composite (available from BTR), in which carbon particles and silicon particles were mechanochemically composited, were used as an anode active material instead of the graphite powder alone, and the electrolyte solution prepared in Comparative Preparation Example 2 was used instead of the electrolyte solution prepared in Preparation Example 1. An average particle diameter of the silicon nanoparticles was about 200 nm, and an average particle diameter of the carbon-silicon composite was about 5 μm.

Examples 2 to 5

Lithium batteries were prepared in the same manner as in Comparative Example 2, except that an organic electrolyte solution as prepared in Preparation Examples 2 to 5 was used in Examples 2 to 5, respectively, instead of the organic electrolyte solution prepared in Comparative Preparation Example 2.

Comparative Example 3

A lithium battery was prepared in the same manner as in Comparative Example 2, except that the organic electrolyte solution prepared in Comparative Preparation Example 3 was used instead of the organic electrolyte solution prepared in Comparative Preparation Example 3.

Example 6: Preparation of Lithium Secondary Battery (Full Cell), Anode=Carbon-Silicon Composite 1

A lithium battery was prepared in the same manner as in Example 1, except that 83.5 parts by weight of a graphite powder (MC20, at a purity of 99.9% or higher, available from Mitsubishi Chemical) and 12.5 parts by weight of a carbon-silicon composite (available from BTR) including carbon-coated silicon particles having a specific capacity of 1300 mAh/g were used as an anode active material instead of the graphite powder alone, and the electrolyte solution prepared in Preparation Example 6 was used instead of the electrolyte solution prepared in Preparation Example 1.

Examples 7 to 10

A lithium battery was prepared in the same manner as in Example 6, except that an organic electrolyte solution as prepared in Preparation Examples 7 to 10 was used in Examples 7 to 10, respectively, instead of the organic electrolyte solution prepared in Preparation Example 6.

Comparative Example 4

A lithium battery was prepared in the same manner as in Example 6, except that the organic electrolyte solution prepared in Comparative Preparation Example 4 was used instead of the organic electrolyte solution prepared in Preparation Example 6.

Evaluation Example 1: Evaluation of Amount of Gas Generated at High-Temperature

In the $1^{st}$ cycle, at room temperature (25° C.), the lithium batteries prepared in Examples 1 to 5 and Comparative Examples 1 and 3 were each charged with a constant current of a 0.5 C rate until a voltage was 4.3 V (vs. Li) and substantially charged with a constant voltage until the current was 0.05 C while the voltage was maintained at 4.3 V (vs. Li). Then, the batteries were each discharged with a constant current of a 0.5 C rate until a voltage of the discharge was 2.8 V (vs. Li). These charging/discharging process was repeated twice more to complete a formation process.

In the $4^{th}$ cycle, the batteries were each charged with a constant current of a 0.5 C rate until a voltage was 4.3 V (vs. Li); substantially charged with a constant voltage until the current was 0.05 C while the voltage was maintained at 4.3 V (vs. Li); and discharged with a constant current of a 0.2 C rate until a voltage of the discharge was 2.8 V (vs. Li).

In the $5^{th}$ cycle, the batteries were each charged with a constant current of a 0.5 C rate until a voltage was 4.3 V (vs. Li); substantially charged with a constant voltage until the current was 0.05 C while the voltage was maintained at 4.3 V (vs. Li); and discharged with a constant current of a 0.2 C rate until a voltage of the discharge was 2.8 V (vs. Li).

In the $6^{th}$ cycle, the batteries were each charged with a constant current of a 0.5 C rate until a voltage was 4.3 V (vs. Li) and substantially charged with a constant voltage until the current was 0.05 C while the voltage was maintained at 4.3 V (vs. Li). The charged batteries were stored in an oven at 60° C. for 10 days, taken out of the oven, and discharged with a constant current of a 0.2 C rate until a voltage of the discharge was 2.8 V (vs. Li). The batteries were each put into a jig and exploded to measure an amount of gas generation by converting an internal gas pressure change into a volume.

Some of the evaluation results are shown in Tables 1 to 4. The amounts of gas generation (milliliters per gram) are shown in values relatively decreased (gas decrease ratio, %) with respect to the amount of gas generation of Comparative Example 1.

TABLE 1

|  | Amount of gas generation [mL/g] | Gas decrease ratio [%] |
| --- | --- | --- |
| Example 1 (APS 1%) | 0.47 | 24 |
| Comparative Example 1 (TMP 1%) | 0.62 | 0 |

As shown in Table 1, the lithium battery of Example 1, which included the organic electrolyte solution including the sulfone-based compound according to an embodiment, had a significantly decreased amount of gas generation, compared to that of the lithium battery of Comparative Example 1, which included an organic electrolyte solution including a phosphate-based compound.

TABLE 2

|  | Amount of gas generation [mL/g] | Gas decrease ratio [%] |
| --- | --- | --- |
| Example 2 (AMS 1%) | 0.38 | 34 |
| Example 3 (MVS 1%) | 0.48 | 16 |
| Example 4 (EVS 1%) | 0.42 | 27 |
| Example 5 (PVS 1%) | 0.38 | 34 |
| Comparative Example 3 (DVSF 0%) | 0.57 | 0 |

As shown in Table 2, the lithium batteries of Examples 2 to 5, which included the organic electrolyte solution including the sulfone compound according to an embodiment, had significantly decreased amounts of gas generation, compared to that of the lithium battery of Comparative Example 3, which included an organic electrolyte solution not including a sulfone-based compound.

Evaluation Example 2: Charge/Discharge Characteristics Evaluation at Room Temperature (25° C.)

At 25° C., the lithium batteries prepared in Examples 6 to 10 and Comparative Example 4 were each charged with a constant current of a 0.1 C rate until a voltage was 4.3 V (vs. Li), and the current was cut-off at a 0.05 C rate while the voltage was maintained at 4.3 V in a constant voltage mode (CV mode). Then, the batteries were each discharged with a constant current of a 0.1 C rate until a voltage of the discharge was 2.8 V (vs. Li) ($1^{st}$ cycle of a formation process).

At 25° C., the lithium batteries that underwent the $1^{st}$ cycle of the formation process were each charged with a constant current of a 0.2 C rate until a voltage was 4.3 V (vs. Li), and the current was cut-off at a 0.05 C rate while the voltage was maintained at 4.3 V in a CV mode. Then, the batteries were discharged with a constant current of a 0.2 C rate until a voltage of the discharge was 2.8 V (vs. Li) ($2^{nd}$ cycle of the formation process).

At 25° C., the lithium batteries that underwent the $2^{nd}$ cycle of the formation process were each charged with a constant current of a 0.5 C rate until a voltage was 4.3 V (vs. Li), and the current was cut-off at a 0.05 C rate while the voltage was maintained at 4.3 V in a CV mode. Then, the batteries were discharged with a constant current of a 1.0 C rate until a voltage of the discharge was 2.8 V (vs. Li) ($3^{rd}$ cycle of the formation process). The cycles were repeated 200 times.

In the whole charging/discharging cycle, 10 minutes of retention time was set after every charging/discharging cycle.

Some of the charging/discharging test results are shown in Table 3. A capacity retention percentage at the $200^{th}$ cycle is defined as shown in Equation 1.

Capacity retention [%]=[A discharge capacity after $200^{th}$ cycle/a discharge capacity after $1^{st}$ cycle]× 100% <Equation 1>

TABLE 3

| Graphite-silicon composite anode | Capacity retention [%] |
| --- | --- |
| Example 6 (APS 1%) | 82.6 |
| Example 7 (AMS 1%) | 83.1 |

TABLE 3-continued

| Graphite-silicon composite anode | Capacity retention [%] |
|---|---|
| Example 9 (EVS 1%) | 83.0 |
| Example 10 (PVS 1%) | 83.8 |
| Comparative Example 4 (DVSF 1%) | 81.2 |

A shown in Table 3, the lithium batteries of Examples 6, 7, 9, and 10, which suppressed gas generation and included the organic electrolyte solutions including the sulfone compounds represented by Formula 1 according to an embodiment, had improved lifespan characteristics (i.e., capacity retention) at room temperature, compared to that of the lithium battery of Comparative Example 4, which included an organic electrolyte solution including a divinyl sulfone compound.

An energy density of the lithium battery prepared in Example 6 was 710 (watt hours per liter) Wh/L.

Evaluation Example 3: Direct Current Internal Resistance (DC-IR) Evaluation at Room Temperature (25° C.)

Initial direct current internal resistances (DC-IRs) of the lithium batteries prepared in Comparative Example 2 and Examples 2 to 5 at 25° C. were evaluated as follows with respect to the lithium battery before the high-temperature storage in the 60° C. oven as in Evaluation Example 1.

In the $1^{st}$ cycle, the batteries were each charged with a constant current of a 0.5 C rate until a voltage of state of charge (SOC) 50%, and the current was cut-off at a 0.02 C rate. Then, the batteries were rested for 10 minutes.

After discharging with a constant current of 0.5 C rate for 30 seconds, the batteries were each rested for 30 seconds, charged with a constant current of 0.5 C rate for 30 seconds, and rested for 10 minutes.

After discharging with a constant current of 1.0 C rate for 30 seconds, the batteries were each rested for 30 seconds, charged with a constant current of 0.5 C rate for 1 minute, and rested for 10 minutes.

After discharging with a constant current of 2.0 C rate for 30 seconds, the batteries were each rested for 30 seconds, charged with a constant current of 0.5 C rate for 2 minutes, and rested for 10 minutes.

After discharging with a constant current of 3.0 C rate for 30 seconds, the batteries were each rested for 30 seconds, charged with a constant current of 0.5 C rate for 3 minutes, and rested for 10 minutes.

Average voltage drop values for 30 seconds per each C-rate are direct-current voltage values. Direct current internal resistances (milliohm, mΩ) were calculated from the measured direct-current voltages, and the results are shown in Table 4.

TABLE 4

| | Initial direct current internal resistance [mΩ] |
|---|---|
| Comparative Example 2 (DVSF 1%) | 252 |
| Example 2 (AMS 1%) | 162 |
| Example 3 (MVS 1%) | 160 |
| Example 4 (EVS 1%) | 161 |
| Example 5 (PVS 1%) | 170 |

As shown in Table 4, the lithium batteries of Examples 2 to 5 had decreased initial direct-current internal resistances, compared to that of the lithium battery of Comparative Example 2.

Without being bound by theory, it is deemed that the decreased initial direct-current voltages occurred since ion conductivities of a protection layer formed on a surface of an anode of the lithium batteries prepared in Examples 2 to 5 were relatively better than that of the lithium battery of Comparative Example 2, which suppressed initial internal resistances as well as suppressing gas generation, and thus the cycle characteristics of the lithium batteries of Examples 2 to 5 improved.

Since the lithium batteries of Examples 2 to 5 has decreased initial resistances, compared to that of the lithium battery of Comparative Example 2, output power characteristics of the lithium battery significantly improved. Therefore, the lithium batteries of Examples 2 to 5 are suitable for the purposes requiring high output power, such as electric vehicles.

A percentage increase in DCIR was calculated using Equation 2.

DCIR increase [%]=[DCIR of battery after $200^{th}$ cycle/DCIR of battery after $1^{st}$ cycle]×100%  Equation 2

The direct current internal resistance (DCIR) after 200 cycles of charging and discharging at 25° C. of the lithium battery of Example 2 according to the experimental conditions of Evaluation Example 2 was 150% of the DCIR after 1 cycle of charging and discharging.

Preparation of Organic Electrolyte Solution

Preparation Example A1: 1.15 M of $LiPF_6$ and 1 wt % of APS (E1)

1.5 wt % of a compound represented by Formula 18a and 1 wt % of a compound represented by Formula 9 were added to a non-aqueous organic solvent prepared by mixing a compound represented by Formula 17a, EC, EMC, and DMC at a volume ratio of 5:20:35:40, and 1.15 M of $LiPF_6$ was used as a lithium salt to prepare an organic electrolyte solution:

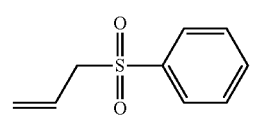

Formula 9

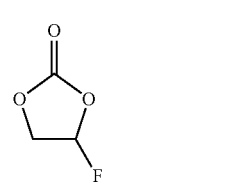

Formula 17a

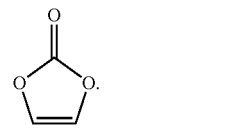

Formula 18a

Preparation Example A2: 1.15 M of $LiPF_6$ and 1 wt % of AMS (E1)

An organic electrolyte solution was prepared in the same manner as in Preparation Example A1, except that 1 wt % of a compound represented by Formula 5 was used instead of 1 wt % of the compound represented by Formula 9:

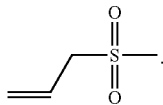
Formula 5

Preparation Example A3: 1.15 M of LiPF$_6$ and 1 wt % of PVS (E1)

An organic electrolyte solution was prepared in the same manner as in Preparation Example A1, except that 1 wt % of a compound represented by Formula 7 was used instead of 1 wt % of the compound represented by Formula 9:

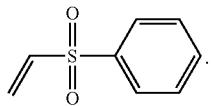
Formula 7

Comparative Preparation Example A1: 1.15 M of LiPF$_6$ and 0 wt % of APS (E1)

An organic electrolyte solution was prepared in the same manner as in Preparation Example A1, except that the compound represented by Formula 9 was not added.

Comparative Preparation Example A2: 1.15 M of LiPF$_6$ and 1 wt % of DVSF (E1)

An organic electrolyte solution was prepared in the same manner as in Preparation Example A1, except that 1 wt % of a compound represented by Formula 10 was used instead of 1 wt % of the compound represented by Formula 9:

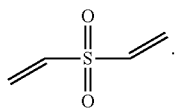
Formula 10

Comparative Preparation Example A3: 1.15 M of LiPF$_6$ and 2 wt % of DVSF (E1)

An organic electrolyte solution was prepared in the same manner as in Preparation Example A1, except that 2 wt % of a compound represented by Formula 10 was used instead of 1 wt % of the compound represented by Formula 9.

Comparative Preparation Example A4: 1.15 M of LiPF$_6$ and 1 wt % of DPS (E1)

An organic electrolyte solution was prepared in the same manner as in Preparation Example A1, except that 1 wt % of a compound represented by Formula 11 was used instead of 1 wt % of the compound represented by Formula 9:

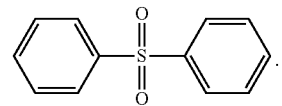
Formula 11

Preparation Example A4: 1.0 M of LiPF$_6$ and 1 wt % of APS (E2)

1.5 wt % of a compound represented by Formula 18a and 1 wt % of a compound represented by Formula 9 were added to a non-aqueous organic solvent prepared by mixing a compound represented by Formula 17a, EC, EMC, and DMC at a volume ratio of 5:20:35:40, and 1.0 M of LiPF$_6$ was used as a lithium salt to prepare an organic electrolyte solution:

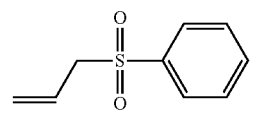
Formula 9

Formula 17a

Formula 18a

Preparation Example A5: 1.0 M of LiPF$_6$ and 1 wt % of AMS (E2)

An organic electrolyte solution was prepared in the same manner as in Preparation Example A4, except that 1 wt % of a compound represented by Formula 5 was used instead of the compound represented by Formula 9:

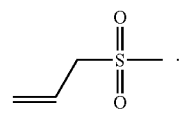
Formula 5

Preparation Example A6: 1.0 M of LiPF$_6$ and 1 wt % of MVS (E2)

An organic electrolyte solution was prepared in the same manner as in Preparation Example A4, except that 1 wt % of a compound represented by Formula 3 was used instead of the compound represented by Formula 9:

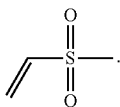

Formula 3

Preparation Example A7: 1.0 M of LiPF$_6$ and 1 wt % of EVS (E2)

An organic electrolyte solution was prepared in the same manner as in Preparation Example A4, except that 1 wt % of a compound represented by Formula 4 was used instead of the compound represented by Formula 9:

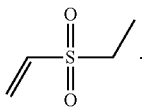

Formula 4

Preparation Example A8: 1.0 M of LiPF$_6$ and 1 wt % of PVS (E2)

An organic electrolyte solution was prepared in the same manner as in Preparation Example A4, except that 1 wt % of a compound represented by Formula 7 was used instead of the compound represented by Formula 9:

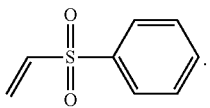

Formula 7

Comparative Preparation Example A5: 1.0 M of LiPF$_6$ and 1 wt % of DVSF (E2)

An organic electrolyte solution was prepared in the same manner as in Preparation Example A4, except that 1 wt % of a compound represented by Formula 10 was used instead of 1 wt % of the compound represented by Formula 9:

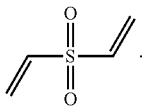

Formula 10

Comparative Preparation Example A6: 1.0 M of LiPF$_6$ and 0 wt % of APS (E2)

An organic electrolyte solution was prepared in the same manner as in Preparation Example A9, except that the compound represented by Formula 9 was not added.

Preparation Example A9: 1.3 M of LiPF$_6$ and 1 wt % of APS (E3)

1.5 wt % of a compound represented by Formula 18a and 1 wt % of a compound represented by Formula 9 were added to a non-aqueous organic solvent prepared by mixing a compound represented by Formula 17a, EC, EMC, and DMC at a volume ratio of 5:20:35:40, and 1.3 M of LiPF$_6$ was used as a lithium salt to prepare an organic electrolyte solution:

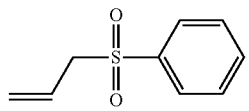

Formula 9

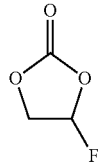

Formula 17a

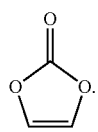

Formula 18a

Preparation Example A10: 1.3 M of LiPF$_6$ and 1 wt % of AMS (E3)

An organic electrolyte solution was prepared in the same manner as in Preparation Example A9, except that 1 wt % of a compound represented by Formula 5 was used instead of the compound represented by Formula 9:

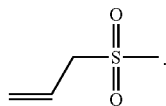

Formula 5

Comparative Preparation Example A7: 1.3 M of LiPF$_6$ and 0 wt % of APS (E3)

An organic electrolyte solution was prepared in the same manner as in Preparation Example A9, except that the compound represented by Formula 9 was not added.

Comparative Preparation Example A8: 1.3 M of LiPF$_6$ and 0.5 wt % of DVSF (E3)

An organic electrolyte solution was prepared in the same manner as in Preparation Example A9, except that 0.5 wt % of a compound represented by Formula 10 was used instead of the compound represented by Formula 9.

Preparation Example A11: 1.3 M of LiPF$_6$, 1 wt % of EVS, and 0 wt % of VC (E4)

1 wt % of a compound represented by Formula 4 was added to a non-aqueous organic solvent prepared by mixing a compound represented by Formula 17a, EC, EMC, and DMC at a volume ratio of 5:20:35:40, and 1.3 M of LiPF$_6$ was used as a lithium salt to prepare an organic electrolyte solution:

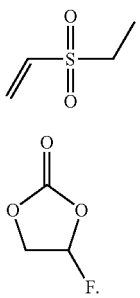

Formula 4

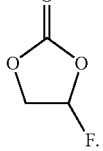

Formula 17a

Preparation Example A12: 1.3 M of LiPF$_6$, 1 wt % of APS, and 0 wt % of VC (E4)

An organic electrolyte solution was prepared in the same manner as in Preparation Example A11, except that 1 wt % of a compound represented by Formula 9 was used instead of the compound represented by Formula 4:

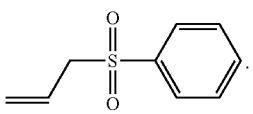

Formula 9

Comparative Preparation Example A9: 1.3 M of LiPF$_6$, 1 wt % of DVSF, and 0 wt % of VC (E4)

An organic electrolyte solution was prepared in the same manner as in Preparation Example A11, except that 1 wt % of a compound represented by Formula 10 was used instead of the compound represented by Formula 4.

Preparation Example A13: 1.0 M of LiPF$_6$, 1 wt % of EVS, and 0 wt % of VC (E5)

1 wt % of a compound represented by Formula 4 was added to a non-aqueous organic solvent prepared by mixing a compound represented by Formula 17a, EC, EMC, and DMC at a volume ratio of 5:20:35:40, and 1.0 M of LiPF$_6$ was used as a lithium salt to prepare an organic electrolyte solution:

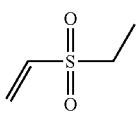

Formula 4

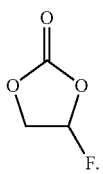

Formula 17a

Preparation Example A14: 1.0 M of LiPF$_6$, 0.6 wt % of EVS, and 0 wt % of VC (E5)

An organic electrolyte solution was prepared in the same manner as in Preparation Example A13, except that an amount of the compound represented by Formula 4 was changed to 0.6 wt %.

Preparation Example A15: 1.0 M of LiPF$_6$, 1 wt % of AMS, and 0 wt % of VC (E5)

An organic electrolyte solution was prepared in the same manner as in Preparation Example A13, except that 1 wt % of a compound represented by Formula 5 was used instead of the compound represented by Formula 4:

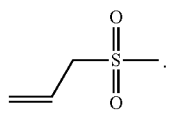

Formula 5

Preparation Example A16: 1.0 M of LiPF$_6$, 0.6 wt % of AMS, and 0 wt % of VC (E5)

An organic electrolyte solution was prepared in the same manner as in Preparation Example A15, except that an amount of the compound represented by Formula 5 was changed to 0.6 wt %.

Preparation Example A17: 1.0 M of LiPF$_6$, 0.3 wt % of AMS, and 0 wt % of VC (E5)

An organic electrolyte solution was prepared in the same manner as in Preparation Example A15, except that an amount of the compound represented by Formula 5 was changed to 0.3 wt %.

Preparation Example A18: 1.0 M of LiPF$_6$, 0.3 wt % of AMS+0.3 wt % of EVS, and 0 Wt % of VC (E5)

An organic electrolyte solution was prepared in the same manner as in Preparation Example A15, except that an amount of the compound represented by Formula 5 was changed to 0.3 wt %, and 0.3 wt % of a compound represented by Formula 4 was added.

Comparative Preparation Example A10: 1.0 M of LiPF$_6$, 0 wt % of AMS+0 wt % of EVS, and 0 wt % of VC (E5)

An organic electrolyte solution was prepared in the same manner as in Preparation Example A13, except that the compound represented by Formula 4 was not used.

(Preparation of Lithium Battery (Full Cell))

Example A1: Preparation of Lithium Secondary Battery (Full Cell), Cathode=NCM(Ni88), Anode=Graphite (Gr)

(Preparation of Cathode)

93.0 wt % of LiNi$_{0.88}$Co$_{0.08}$Mn$_{0.04}$O$_2$ as a cathode active material, 4.0 wt % of Denka black as a conducting agent, and 3.0 wt % of PVDF (Solef 6020, available from Solvay) as a binder were mixed to prepare a mixture. The mixture was added to N-methyl-2-pyrrolidone (NMP) as a solvent so that a solid content was 70%, and the solid was dispersed in the solvent for 30 minutes by using a mechanical stirrer to prepare a cathode active material composition. The cathode active material composition was two-surface coated on an aluminum foil current collector having a thickness of 12 μm by using a 3-roll coated, dried in a hot-air drier at 100° C. for 0.5 hours, dried again in vacuum at 120° C. for 4 hours, and roll-pressed to prepare a cathode in which a cathode active material layer was formed on the current collector.
(Preparation of Anode)

97 wt % of graphite powder (MC20, at a purity of 99.9% or higher, available from Mitsubishi Chemical) as an anode active material, 1.5 wt % of SBR as a binder, and 1.5 wt % of CMC were mixed to prepare a mixture. The mixture was added to NMP as a solvent so that a solid content was 70%, and the solid was dispersed in the solvent for 60 minutes by using a mechanical stirrer to prepare an anode active material composition. The anode active material composition was two-surface coated on a copper foil current collector having a thickness of 10 μm by using a 3-roll coater, dried in a hot-air drier at 100° C. for 0.5 hours, dried again in vacuum at 120° C. for 4 hours, and roll-pressed to prepare an anode in which an anode active material layer was formed on the current collector.
(Assembly of Lithium Battery)

The cathode and the anode thus prepared, a polyethylene separator, and the electrolyte solution prepared in Preparation Example A1 as an electrolyte solution were used to prepare a 18650 cylindrical type lithium battery. The lithium battery was prepared to have a capacity of about 0.5 Ah and a current density (loading level) of 4.4 mAh/cm$^2$.

Comparative Examples A1 to A4

Lithium batteries were prepared in the same manner as in Example A1, except that the organic electrolyte solutions prepared in Comparative Preparation Examples A1 to A4 were each used instead of the organic electrolyte solution prepared in Preparation Example A1.

Example A2: Preparation of Lithium Secondary Battery (Full Cell), Cathode=NCM(Ni88), Anode=Graphite (Gr)

A lithium battery was prepared in the same manner as in Example A1. The lithium battery was adjusted to have a capacity of about 0.5 Ah and a current density (loading level) of 3.4 mAh/cm$^2$.

Examples A3 and A4

Lithium batteries were prepared in the same manner as in Example A2, except that the organic electrolyte solutions prepared in Preparation Examples A2 and A3 were each used instead of the organic electrolyte solution prepared in Preparation Example A1.

Comparative Examples A5 to A7

Lithium batteries were prepared in the same manner as in Example A2, except that the organic electrolyte solutions prepared in Comparative Preparation Examples A2, A1, and A4 were each used instead of the organic electrolyte solution prepared in Preparation Example A1.

Example A5: Preparation of Lithium Secondary Battery (Full Cell), Cathode=NCM(Ni88), Anode=Carbon-Silicon Composite 1

A lithium battery was prepared in the same manner as in Example A1, except that 83.5 parts by weight of a graphite powder (MC20, at a purity of 99.9% or higher, available from Mitsubishi Chemical) and 12.5 parts by weight of a carbon-silicon composite (available from BTR) including carbon-coated silicon particles having a specific capacity of 1300 mAh/g were used as an anode active material instead of the graphite powder alone, and the electrolyte solution prepared in Preparation Example A4 was used instead of the electrolyte solution prepared in Preparation Example A1. The lithium battery was adjusted to have a capacity of about 0.5 Ah and a current density (loading level) of 3.4 mAh/cm$^2$.

Examples A6 to A9

Lithium batteries were prepared in the same manner as in Example A5, except that the organic electrolyte solutions prepared in Preparation Examples A5 and A8 were each used instead of the organic electrolyte solution prepared in Preparation Example A4.

Comparative Examples A8 and A9

Lithium batteries were prepared in the same manner as in Example A5, except that the organic electrolyte solutions prepared in Comparative Preparation Examples A5 and A6 were each used instead of the organic electrolyte solution prepared in Preparation Example A4.

Example A10: Preparation of Lithium Secondary Battery (Full Cell), Cathode=NCA(Ni88), Anode=Graphite (Gr)

A lithium battery was prepared in the same manner as in Example A1, except that $LiNi_{0.88}Co_{0.08}Al_{0.04}O_2$ was used instead of $LiNi_{0.88}Co_{0.08}Mn_{0.04}O_2$, and the electrolyte solution prepared in Preparation Example A9 was used instead of the electrolyte solution prepared in Preparation Example A1

The lithium battery was adjusted to have a capacity of about 0.5 Ah and a current density (loading level) of 3.4 mAh/cm$^2$.

Example A11

A lithium battery was prepared in the same manner as in Example A10, except that the organic electrolyte solutions prepared in Preparation Example A10 was used instead of the organic electrolyte solution prepared in Preparation Example A9.

Comparative Examples A10 and A11

Lithium batteries were prepared in the same manner as in Example A10, except that the organic electrolyte solutions prepared in Comparative Preparation Examples A7 and A8 were each used instead of the organic electrolyte solution prepared in Preparation Example A9.

Example A12: Preparation of Lithium Secondary Battery (Full Cell), Cathode=NCA(Ni92), Anode=Carbon-Silicon Composite 1

A lithium battery was prepared in the same manner as in Example A1, except that $LiNi_{0.92}Co_{0.04}Al_{0.04}O_2$ was used as a cathode active material instead of $LiNi_{0.88}Co_{0.08}Mn_{0.04}O_2$, and 83.5 parts by weight of a graphite powder (MC20, at a purity of 99.9% or higher, available from Mitsubishi Chemical) and 12.5 parts by weight of a carbon-silicon composite (available from BTR) including carbon-coated silicon particles having a specific capacity of 1300 mAh/g were used as an anode active material instead of the graphite powder alone, and the electrolyte solution prepared in Preparation Example A11 was used instead of the electrolyte solution prepared in Preparation Example A1.

The lithium battery was adjusted to have a capacity of about 5.3 Ah and a current density (loading level) of 4.6 mAh/cm$^2$.

Example A13

A lithium battery was prepared in the same manner as in Example A12, except that the organic electrolyte solutions prepared in Preparation Example A12 was used instead of the organic electrolyte solution prepared in Preparation Example A11.

Comparative Example A12

A lithium battery was prepared in the same manner as in Example A12, except that the organic electrolyte solutions prepared in Comparative Preparation Example A9 was used instead of the organic electrolyte solution prepared in Preparation Example 6.

Example A14: Preparation of Lithium Secondary Battery (Full Cell), Cathode=NCM(Ni60), Anode=Graphite (Gr)

A lithium battery was prepared in the same manner as in Example A1, except that $LiNi_{0.60}Co_{0.20}Mn_{0.20}O_2$ was used as a cathode active material instead of the $LiNi_{0.88}Co_{0.08}Mn_{0.04}O_2$ graphite powder, and the electrolyte solution prepared in Preparation Example A13 was used instead of the electrolyte solution prepared in Preparation Example A1.

The lithium battery was adjusted to have a capacity of about 4.1 Ah and a current density (loading level) of 4.5 mAh/cm$^2$.

Example A15

A lithium battery was prepared in the same manner as in Example A14, except that the organic electrolyte solutions prepared in Preparation Example A15 was used instead of the organic electrolyte solution prepared in Preparation Example A13.

Comparative Example A13

A lithium battery was prepared in the same manner as in Example A14, except that the organic electrolyte solution prepared in Comparative Preparation Example A10 was used instead of the organic electrolyte solution prepared in Preparation Example A13.

Example A16: Preparation of Lithium Secondary Battery (Full Cell), Cathode=NCM(Ni88), Anode=Carbon-Silicon Composite 1

A lithium battery was prepared in the same manner as in Example A1, except that 83.5 parts by weight of a graphite powder (MC20, at a purity of 99.9% or higher, available from Mitsubishi Chemical) and 12.5 parts by weight of a carbon-silicon composite (available from BTR) including carbon-coated silicon particles having a specific capacity of 1300 mAh/g were used as an anode active material instead of the graphite powder alone, and the electrolyte solution prepared in Preparation Example A13 was used instead of the electrolyte solution prepared in Preparation Example A1. Not a cylindrical type lithium battery but a stack type lithium battery was prepared.

The lithium battery was adjusted to have a capacity of about 1 Ah and a current density (loading level) of 6.0 mAh/cm$^2$.

Examples A17 to A20

Lithium batteries were prepared in the same manner as in Example A16, except that the organic electrolyte solutions prepared in Preparation Examples A14, A16, A17, and A18 were each used instead of the organic electrolyte solution prepared in Preparation Example A13.

Comparative Example A14

A lithium battery was prepared in the same manner as in Example A16, except that the organic electrolyte solution prepared in Comparative Preparation Example A10 was used instead of the organic electrolyte solution prepared in Preparation Example A13.

Evaluation Example A1: Evaluation of Amount of Gas Generated at High-Temperature In the 1$^{st}$ cycle, at room temperature (25° C.), the lithium batteries prepared in Examples A1 to A20 and Comparative Examples A1 to A11 were each charged with a constant current of a 0.5 C rate until a voltage was 4.3 V and substantially charged with a constant voltage until the current was 0.05 C while the voltage was maintained at 4.3 V. Then, the batteries were each discharged with a constant current of a 0.5 C rate until a voltage of the discharge was 2.8 V. These charging/discharging process was repeated twice more to complete a formation process.

In the 2$^{nd}$ cycle, the batteries were each charged with a constant current of a 0.5 C rate until a voltage was 4.3 V; substantially charged with a constant voltage until the current was 0.05 C while the voltage was maintained at 4.3 V; and discharged with a constant current of a 0.2 C rate until a voltage of the discharge was 2.8 V.

In the 3$^{rd}$ cycle, the batteries were each charged with a constant current of a 0.5 C rate until a voltage was 4.3 V; substantially charged with a constant voltage until the current was 0.05 C while the voltage was maintained at 4.3 V; and discharged with a constant current of a 0.2 C rate until a voltage of the discharge was 2.8 V.

In the 4$^{th}$ cycle, the batteries were each charged with a constant current of a 0.5 C rate until a voltage was 4.3 V and substantially charged with a constant voltage until the current was 0.05 C while the voltage was maintained at 4.3 V. The charged batteries were stored in an oven at 60° C. for 10 days, taken out of the oven, and discharged until a voltage of the discharge was 2.8 V. The batteries were each put into a jig and exploded to measure an amount of gas generation by converting an internal gas pressure change into a volume.

Some of the evaluation results are shown in Tables A2, A3, A5, and A7. The amounts of gas generation are shown in values relatively decreased with respect to the amount of gas generation of Comparative Example.

Evaluation Example A2: Charge/Discharge Characteristics Evaluation at Room Temperature (25° C.)

At 25° C., the lithium batteries prepared in Examples A1 to A20 and Comparative Examples A1 to A11 were each charged with a constant current of a 0.1 C rate until a voltage was 4.3 V (vs. Li), and the current was cut-off at a 0.05 C rate while the voltage was maintained at 4.3 V in a constant voltage (CV) mode. Then, the batteries were each discharged with a constant current of a 0.1 C rate until a voltage of the discharge was 2.8 V (vs. Li) ($1^{st}$ cycle of a formation process).

At 25° C., the lithium batteries that underwent the $1^{st}$ cycle of the formation process were each charged with a constant current of a 0.2 C rate until a voltage was 4.3 V (vs. Li), and the current was cut-off at a 0.05 C rate while the voltage was maintained at 4.3 V in a CV mode. Then, the batteries were discharged with a constant current of a 0.2 C rate until a voltage of the discharge was 2.8 V (vs. Li) ($2^{nd}$ cycle of the formation process).

At 25° C., the lithium batteries that underwent the formation process were each charged with a constant current of a 0.5 C rate until a voltage was 4.3 V (vs. Li), and the current was cut-off at a 0.05 C rate while the voltage was maintained at 4.3 V in a CV mode. Then, the batteries were discharged with a constant current of a 1.0 C rate until a voltage of the discharge was 2.8 V (vs. Li). The charging/discharging cycles were repeated 200 times.

In the whole charging/discharging cycle, 10 minutes of retention time was set after every charging/discharging cycle.

Some of the charging/discharging test results are shown in Tables A1, A3, A5, A7, and A9. A capacity retention ratio at the $200^{th}$ cycle is defined as shown in Equation 1.

Capacity retention ratio at $200^{th}$ cycle [%]=[A discharge capacity at $200^{th}$ cycle/a discharge capacity at $1^{st}$ cycle]×100%  <Equation 1>

Evaluation Example A3: Evaluation of Amount of Gas Generated after Charging/Discharging at Room Temperature After the room temperature charging/discharging characteristics evaluation was completed, the lithium batteries prepared in Examples A1 to A20 and Comparative Examples A1 to A11 were each put into a jig and exploded to measure an amount of gas generated by converting an internal gas pressure change into a volume.

Some of the evaluation results are shown in Table A1. The amounts of gas generation are shown in values relatively decreased with respect to the amount of gas generation of Comparative Example.

Evaluation Example A4: Initial Direct Current Internal Resistance (DC-IR) Evaluation at Room Temperature (25° C.)

Initial direct current internal resistances (DC-IRs) of the lithium batteries prepared in Examples A1 to A20 and Comparative Examples A1 to A11 at 25° C. were evaluated as follows with respect to the lithium battery before the high-temperature storage in the 60° C. oven as in Evaluation Example A1.

In the $1^{st}$ cycle, the batteries were each charged with a constant current of a 0.5 C rate until a voltage of state of charge (SOC) 50%, and the current was cut-off at a 0.02 C rate. Then, the batteries were rested for 10 minutes.

After discharging with a constant current of 0.5 C rate for 30 seconds, the batteries were each rested for 30 seconds, charged with a constant current of 0.5 C rate for 30 seconds, and rested for 10 minutes.

After discharging with a constant current of 1.0 C rate for 30 seconds, the batteries were each rested for 30 seconds, charged with a constant current of 0.5 C rate for 1 minute, and rested for 10 minutes.

After discharging with a constant current of 2.0 C rate for 30 seconds, the batteries were each rested for 30 seconds, charged with a constant current of 0.5 C rate for 2 minutes, and rested for 10 minutes.

After discharging with a constant current of 3.0 C rate for 30 seconds, the batteries were each rested for 30 seconds, charged with a constant current of 0.5 C rate for 3 minutes, and rested for 10 minutes.

Average voltage drop values for 30 seconds per each C-rate are direct-current voltage values. Direct resistances were calculated from the measured direct-current voltages, and the results are shown in Tables A1, A2, A4, A6, and A7.

Evaluation Example 5: Stability Evaluation at High Temperature of 60° C. (High Temperature Capacity Recovery Rate)

In the $1^{st}$ cycle, at room temperature (25° C.), the lithium batteries prepared in Examples A14 and A15 and Comparative Example A10 were each charged with a constant current of a 0.5 C rate until a voltage was 4.3 V and substantially charged with a constant voltage until the current was 0.05 C while the voltage was maintained at 4.3 V. Then, the batteries were each discharged with a constant current of a 0.5 C rate until a voltage of the discharge was 2.8 V.

In the $2^{nd}$ cycle, the batteries were each charged with a constant current of a 0.5 C rate until a voltage was 4.3 V; substantially charged with a constant voltage until the current was 0.05 C while the voltage was maintained at 4.3 V; and discharged with a constant current of a 0.2 C rate until a voltage of the discharge was 2.8 V.

In the $3^{rd}$ cycle, the batteries were each charged with a constant current of a 0.5 C rate until a voltage was 4.3 V; substantially charged with a constant voltage until the current was 0.05 C while the voltage was maintained at 4.3 V; and discharged with a constant current of a 0.2 C rate until a voltage of the discharge was 2.8 V.

In the $4^{th}$ cycle, the batteries were each charged with a constant current of a 0.5 C rate until a voltage was 4.3 V and substantially charged with a constant voltage until the current was 0.05 C while the voltage was maintained at 4.3 V.

Then, the charged batteries were stored in an oven at 60° C. for 30 days, taken out of the oven, and underwent the discharge of the $4^{th}$ cycle at a 0.1 C rate until a voltage of the discharge was 2.8 V.

The charging/discharging evaluation results are shown in Table A8. A capacity retention ratio after the high temperature storage is defined as shown in Equation 3.

Capacity retention ratio [%]=[a discharge capacity after leaving at high temperature in $4^{th}$ cycle/ standard capacity]×100%  <Equation 3>

(The Standard Capacity is a Discharge Capacity in the 3$^{rd}$ Cycle)

TABLE A1

| Ni88NCM/Gr/E1 | Initial direct constant internal resistance [mΩ] | Capacity retention ratio at room temperature [%] | Gas decrease ratio after charging/ discharging at room temperature [%] |
|---|---|---|---|
| Example A1 (APS 1%) | 188 | 92.9 | 50 |
| Comparative Example A1 (APS 0%) | 184 | 92.3 | 0 |
| Comparative Example A2 (DVSF 1%) | 204 | 91.1 | 70 |
| Comparative Example A3 (DVSF 2%) | 237 | 86.7 | 75 |
| Comparative Example A4 (DPS 1%) | 192 | 92.4 | 0 |

As shown in Table A1, the lithium battery of Example A1, which included the organic electrolyte solution including the sulfone-based compound according to an embodiment, had improved lifespan characteristics, compared to that of the lithium battery of Comparative Examples A1 to A4.

The lithium battery of Example A1 had a decreased initial resistance, as compared to those of the lithium batteries of Comparative Examples A2 to A4, and had an initial resistance similar to that of the lithium battery of Comparative Example A1.

The lithium battery of Example A1 had a significantly decreased amount of gas generation, compared to those of the lithium batteries of Comparative Examples A1 and A4.

When the initial resistance of the lithium battery is high, output power characteristics of the lithium battery is significantly reduced, and thus, it is difficult to apply to the purposes requiring high output power, such as electric vehicles.

TABLE A2

| Ni88NCM/Gr/E1 | Initial direct current internal resistance [mΩ] | Gas decrease ratio after leaving at high temperature [%] |
|---|---|---|
| Example A2 (APS 1%) | 133 | 28 |
| Example A3 (AMS 1%) | 128 | 33 |
| Example A4 (PVS 1%) | 130 | 23 |
| Comparative Example A5 (DVSF 1%) | 150 | 49 |
| Comparative Example A6 (DVSF 0%) | 120 | 0 |
| Comparative Example A7 (DPS 1%) | 125 | 0 |

As shown in Table A2, the lithium batteries of Examples A2 to A4, which included the organic electrolyte solution including the sulfone-based compound according to an embodiment, had significantly decreased initial resistances, compared to that of the lithium battery of Comparative Example A5.

The lithium batteries of Examples A2 to A4 had significantly decreased amounts of gas generation, compared to those of the lithium batteries of Comparative Examples A6 and A7.

TABLE A3

| Ni88NCM/Si + Gr/E2 | Capacity retention ratio at room temperature [%] | Gas decrease ratio after leaving at high temperature [%] |
|---|---|---|
| Example A5 (APS 1%) | 82.8 | 32 |
| Example A6 (AMS 1%) | 83.8 | 34 |
| Example A8 (EVS 1%) | 83.1 | 36 |
| Example A9 (PVS 1%) | 83.5 | 34 |
| Comparative Example A8 (DVSF 1%) | 81.1 | 45 |
| Comparative Example A9 (DVSF 0%) | 83.7 | 0 |

As shown in Table A3, the lithium batteries of Examples A5, A6, A8, and A9, which included the organic electrolyte solution including the sulfone-based compound according to an embodiment, had improved lifespan characteristics, compared to that of the lithium battery of Comparative Example A8.

The lithium batteries of Examples A5, A6, A8, and A9 had significantly decreased amounts of gas generation, compared to that of the lithium battery of Comparative Example A9.

TABLE A4

| Ni88NCM/Si + Gr/E2 | Initial direct current internal resistance [mΩ] |
|---|---|
| Example A5 (APS 1%) | 143 |
| Example A6 (AMS 1%) | 138 |
| Example A7 (MVS 1%) | 142 |
| Example A8 (EVS 1%) | 132 |
| Example A9 (PVS 1%) | 152 |
| Comparative Example A8 (DVSF 1%) | 165 |

As shown in Table A4, the lithium batteries of Examples A5, A6, A8, and A9, which included the sulfone-based compound according to an embodiment, had decreased initial resistances, as compared to that of the lithium battery of Comparative Example A8.

When the initial resistance of the lithium battery is high, output power characteristics of the lithium battery is significantly reduced, and thus, it is difficult to apply to the purposes requiring high output power, such as electric vehicles.

TABLE A5

| Ni88NCA/Gr/E3 | Capacity retention ratio at room temperature [%] | Gas decrease ratio after leaving at high temperature [%] |
|---|---|---|
| Example A11 (AMS 1%) | 83.8 | 31 |
| Comparative Example A10 (APS 0%) | 81.0 | 0 |
| Comparative Example A11 (DVSF 0.5%) | 83.1 | 36 |

As shown in Table A5, the lithium battery of Example A11, which included the organic electrolyte solution including the sulfone-based compound according to an embodiment, had improved lifespan characteristics, compared to those of the lithium batteries of Comparative Examples A10 and A11.

The lithium battery of Example A11 had a significantly decreased amount of gas generation, compared to that of the lithium battery of Comparative Example A10.

TABLE A6

| Ni88NCA/Gr/E3 | Initial direct current internal resistance [mΩ] |
|---|---|
| Example A10 (APS 1%) | 147 |
| Example A11 (AMS 1%) | 144 |
| Comparative Example A11 (DVSF 0.5%) | 158 |

As shown in Table A6, the lithium batteries of Examples A10 and A11, which included the organic electrolyte solution including the sulfone-based compound according to an embodiment, had decreased initial resistances, compared to that of the lithium battery of Comparative Example A11.

When the initial resistance of the lithium battery is high, output power characteristics of the lithium battery is significantly reduced, and thus, it is difficult to apply to the purposes requiring high output power, such as electric vehicles.

TABLE A7

| Ni88NCA/Si + Gr/E4 | Initial direct current internal resistance [mΩ] | Capacity retention ratio at room temperature [%] | Gas decrease ratio after leaving at high temperature [%] |
|---|---|---|---|
| Example A12 (APS 1%) | 36 | 88.2 | 40 |
| Example A13 (AMS 1%) | 36 | 88.3 | 32 |
| Comparative Example A12 (DVSF 1%) | 44 | 85.2 | 43 |

As shown in Table A7, the lithium batteries of Examples A12 and A13, which included the organic electrolyte solution including the sulfone-based compound according to an embodiment, had decreased initial resistances and improved lifespan characteristics, compared to those of the lithium battery of Comparative Example A12.

The lithium batteries of Examples A12 and A13 had significantly decreased amounts of gas generation, compared to that of the lithium battery of Comparative Example A12.

TABLE A8

| Ni60NCM/Gr/E5 | Capacity recovery ratio at high temperature [%] |
|---|---|
| Example A14 (EVS 1%) | 95.2 |
| Example A15 (AMS 1%) | 95.3 |
| Comparative Example A13 (EVS 0%) | 91.0 |

As shown in Table A8, the lithium batteries of Examples A14 and A15, which included the organic electrolyte solution including the sulfone-based compound according to an embodiment, had improved capacity recovery ratios after high-temperature storage, compared to that of the lithium battery of Comparative Example A13.

TABLE A9

| Ni88NCM/Si + Gr/E5 | Capacity retention ratio at room temperature [%] |
|---|---|
| Example A16 (EVS 1%) | 92.8 |
| Example A17 (EVS 0.6%) | 93.4 |
| Example A18 (AMS 0.6%) | 93.5 |
| Example A19 (AMS 0.3%) | 93.5 |
| Example A20 (AMS 0.3% + EVS 0.3%) | 93.4 |
| Comparative Example A14 (EVS 0%) | 92.8 |

As shown in Table A9, the lithium batteries of Examples A16 to A20, which included the organic electrolyte solution including the sulfone-based compound according to an embodiment, had improved lifespan characteristics, compared to that of the lithium battery of Comparative Example A14.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the FIGURES, it will be understood by those of ordinary skill in the art that various changes in form and details may be made therein without departing from the spirit and scope as defined by the following claims.

What is claimed is:

1. An organic electrolyte solution, comprising:
   a lithium salt;
   an organic solvent; and
   an electrolyte additive for a lithium battery comprising a sulfone compound represented by Formula 1:

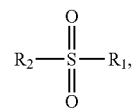

Formula 1 wherein, in Formula 1,
$R_1$ is a halogen-substituted or unsubstituted C1-C5 alkyl group, a halogen-substituted or unsubstituted C4-C10 cycloalkyl group, a halogen-substituted or unsubstituted C5-C10 aryl group, or a halogen-substituted or unsubstituted C2-C10 heteroaryl group, and
$R_2$ is a halogen-substituted or unsubstituted C2-C10 alkenyl group,
wherein the organic solvent comprises a cyclic carbonate compound represented by Formula 17:

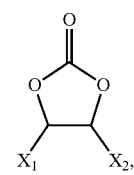

Formula 17 wherein, in Formula 17,
$X_1$ and $X_2$ are each independently a hydrogen atom or a halogen atom, and at least one of $X_1$ and $X_2$ is fluorine, and wherein an amount of the cyclic carbonate compound represented by Formula 17 is 10 volume percent or less based on a total volume of the organic solvent.

2. The organic electrolyte solution of claim 1, wherein the sulfone compound represented by Formula 1 is a sulfone compound represented by Formula 2:

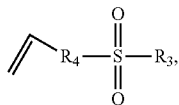

Formula 2 wherein, in Formula 2, $R_3$ is a halogen-substituted or unsubstituted C1-C5 alkyl group or a halogen-substituted or unsubstituted C5-C10 aryl group, and $R_4$ is a covalent bond, a C1-C5 alkylene group or a C2-C10 alkenylene group.

3. The organic electrolyte solution of claim 1, wherein the sulfone compound represented by Formula 1 is a compound represented by one of Formulae 3 to 9:

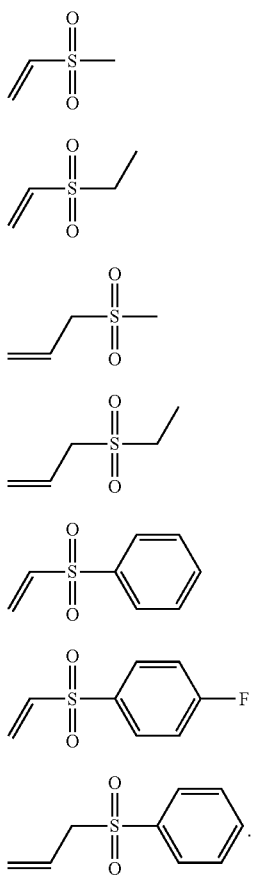

Formula 3

Formula 4

Formula 5

Formula 6

Formula 7

Formula 8

Formula 9

4. The organic electrolyte solution of claim 1, wherein an amount of the sulfone compound represented by Formula 1 is in a range of about 0.1 weight percent to about 3 weight percent based on the total weight of the organic electrolyte solution.

5. The organic electrolyte solution of claim 1, wherein the organic solvent comprises a cyclic carbonate compound represented by Formula 17a:

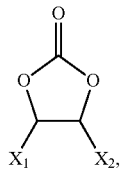

Formula 17 wherein, in Formula 17a, $X_1$ is a hydrogen atom and $X_2$ is fluorine.

6. The organic electrolyte solution of claim 5, wherein an amount of the cyclic carbonate compound represented by Formula 17a is about 10 volume percent or less based on a total volume of the organic solvent.

7. The organic electrolyte solution of claim 1, wherein the organic electrolyte solution further comprises a cyclic carbonate compound represented by Formula 18:

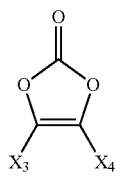

Formula 18 wherein, in Formula 18, $X_3$ and $X_4$ are each independently a hydrogen atom, a halogen atom, or a C1-C3 alkyl group.

8. The organic electrolyte solution of claim 7, wherein an amount of the cyclic carbonate compound represented by Formula 18 is about 3 weight percent or less based on the total weight of the organic electrolyte solution.

9. The organic electrolyte solution of claim 1, wherein the organic solvent further comprises at least one of ethylmethyl carbonate, methylpropyl carbonate, ethylpropyl carbonate, dimethyl carbonate, diethyl carbonate, dipropyl carbonate, propylene carbonate, ethylene carbonate, butylene carbonate, ethyl propionate, ethyl butyrate, acetonitrile, succinonitrile, adiponitrile, dimethyl sulfoxide, dimethyl formamide, dimethyl acetamide, gamma-valerolactone, gamma-butyrolactone, and tetrahydrofuran.

10. The organic electrolyte solution of claim 1, wherein the sulfone compound represented by Formula 1 is a compound represented by one of Formulae 3 to 9 and is contained in an amount of about 0.1 weight percent to about 3 weight, the organic electrolyte solution further comprises a compound represented by Formula 18a contained in an amount of about 0.1 weight percent to about 2 weight percent, each based on the total weight of the organic electrolyte solution, and the cyclic carbonate compound represented by Formula 17 is a compound represented by Formula 17a and is contained in an amount of about 1 volume percent to about 10 volume percent, based on a total volume of the organic solvent:

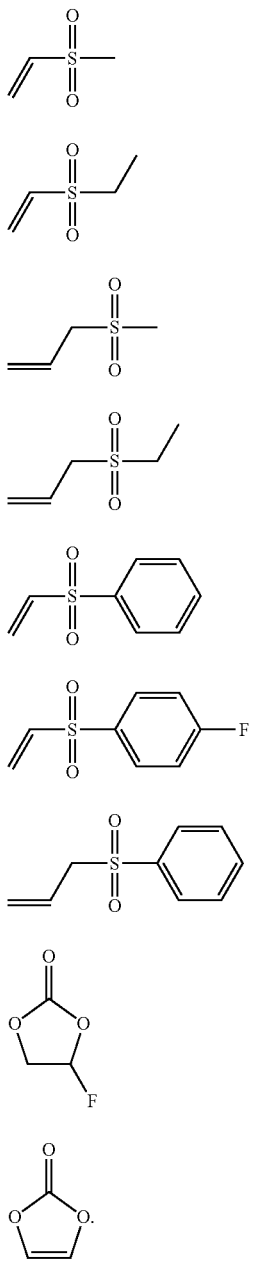

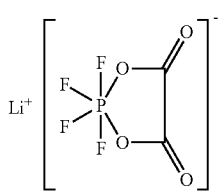

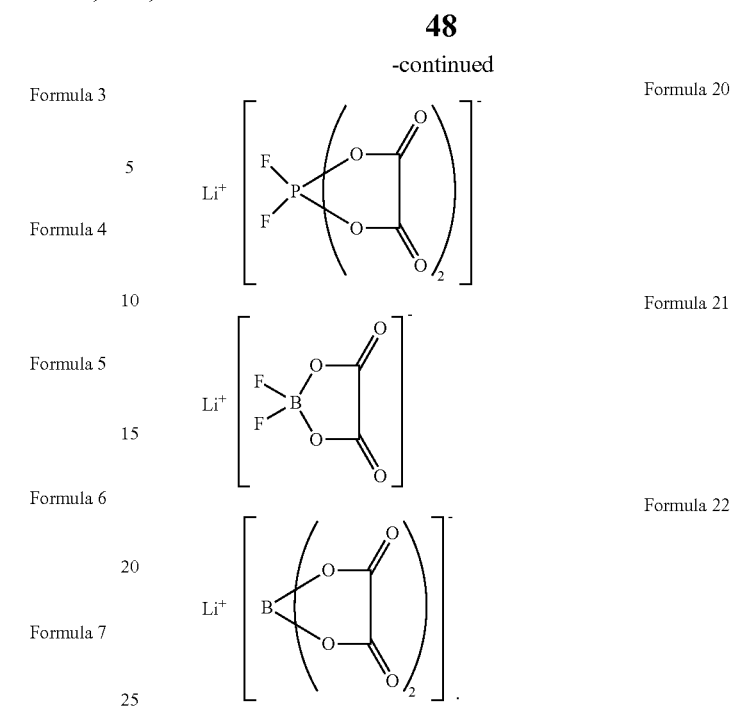

11. The organic electrolyte solution of claim 1, wherein the lithium salt comprises at least one selected from LiPF$_6$, LiBF$_4$, LiCF$_3$SO$_3$, Li(CF$_3$SO$_2$)$_2$N, LiC$_2$F$_5$SO$_3$, Li(FSO$_2$)$_2$N, LiC$_4$F$_9$SO$_3$, LiN(SO$_2$CF$_2$CF$_3$)$_2$, and compounds represented by Formulae 19 to 22:

12. The organic electrolyte solution of claim 1, wherein a concentration of the lithium salt in the organic electrolyte solution is in a range of about 0.01 molar to about 5 molar, based on a total volume of the organic electrolyte solution.

13. A lithium battery comprising:
a cathode comprising a cathode active material;
an anode comprising an anode active material; and
the organic electrolyte solution of claim 1 disposed between the cathode and the anode.

14. The lithium battery of claim 13, wherein the cathode active material comprises a lithium transition metal oxide including nickel and at least one transition metal other than nickel, wherein an amount of the nickel is about 60 mole percent or more, based on the total number of moles of the nickel and the at least one transition metal.

15. The lithium battery of claim 14, wherein the lithium transition metal oxide is represented by Formula 23:

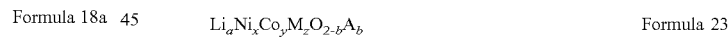

wherein, in Formula 23,
1.0≤a≤1.2, 0≤b≤0.2, 0.6≤x≤1, 0<y≤0.3, 0<z≤0.3, and x+y+z=1,
M is at least one of manganese, vanadium, magnesium, gallium, silicon, tungsten, molybdenum, iron, chromium, copper, zinc, titanium, aluminum, and boron, and
A is at least one of F, S, Cl, and Br.

16. The lithium battery of claim 14, wherein the lithium transition metal oxide is a compound represented by one of Formulae 24 and 25:

wherein, in Formulae 24 and 25, x, y, and z are each independently 0.6≤x≤0.95, 0<y≤0.2, and 0<z≤0.1.

17. The lithium battery of claim 13, wherein the anode active material comprises at least one of a silicon compound, a carbonaceous material, and a composite of a silicon compound and a carbonaceous material.

18. The lithium battery of claim 17, wherein the silicon compound is a silicon oxide of the formula $SiO_x$ wherein $0<x<2$, and wherein the anode active material comprises a composite of the silicon oxide and the carbonaceous material.

19. The lithium battery of claim 17, wherein in the composite, the silicon compound is in a form of a silicon nanoparticle, and wherein the carbonaceous material is disposed on the silicon nanoparticle in the form of a coating.

20. The lithium battery of claim 17, wherein an average secondary particle diameter of the composite of the silicon compound and the carbonaceous material is in a range of about 5 micrometers to about 20 micrometers, and an average particle diameter of the silicon nanoparticles is about 200 nanometers or less.

21. The lithium battery of claim 1, wherein a direct current internal resistance of the lithium battery after 200 cycles of charging and discharging is about 155% or less than a direct current internal resistance of the lithium battery after 1 cycle of charging and discharging, when determined at 25° C.

22. The lithium battery of claim 1, wherein an energy density per cell unit volume is about 500 watt hours per liter or greater.

* * * * *